US012809148B2

(12) United States Patent
Matsumoto et al.

(10) Patent No.: US 12,809,148 B2
(45) Date of Patent: Nov. 24, 2026

(54) MICROSCOPE AND IMAGE PROCESSING METHOD

(71) Applicant: HAMAMATSU PHOTONICS K.K., Hamamatsu (JP)

(72) Inventors: Naoya Matsumoto, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 26 days.

(21) Appl. No.: 18/703,426

(22) PCT Filed: Oct. 7, 2022

(86) PCT No.: PCT/JP2022/037668
§ 371 (c)(1),
(2) Date: Apr. 22, 2024

(87) PCT Pub. No.: WO2023/074326
PCT Pub. Date: May 4, 2023

(65) Prior Publication Data

US 2025/0231386 A1 Jul. 17, 2025

(30) Foreign Application Priority Data

Oct. 28, 2021 (JP) ................................ 2021-176274

(51) Int. Cl.
*G02B 21/00* (2006.01)
*G02B 21/16* (2006.01)
*G06T 11/00* (2006.01)

(52) U.S. Cl.
CPC ....... *G02B 21/0032* (2013.01); *G02B 21/008* (2013.01); *G02B 21/16* (2013.01); *G06T 11/00* (2013.01)

(58) Field of Classification Search
None
See application file for complete search history.

(56) References Cited

U.S. PATENT DOCUMENTS

2012/0307238 A1* 12/2012 Fujita .................. G02B 21/002 356/338
2021/0191095 A1 6/2021 Howard et al.

FOREIGN PATENT DOCUMENTS

WO WO-2006/061947 A1 6/2006
WO 2011/099269 A1 8/2011

OTHER PUBLICATIONS

Chakraborty, Sandeep et al., "Saturated two-photon excitation fluorescence microscopy for the visualization of cerebral neural networks at millimeters deep depth," Journal of Biophotonics, issue 1, e201800136, Jan. 8, 2019, vol. 12, pp. 1-11.

(Continued)

*Primary Examiner* — Hoon K Song
(74) *Attorney, Agent, or Firm* — Faegre Drinker Biddle & Reath LLP

(57) ABSTRACT

A microscope device includes an excitation beam output unit, an optical system, and a harmonic detector. The excitation beam output unit outputs excitation beam. A temporal waveform of a light intensity of the excitation beam includes an n-th root (n is an integer of 2 or more) of a linear function of a sine wave. A maximum value of the light intensity of the excitation beam is higher than a saturation excitation intensity of an object to be observed. The optical system irradiates the object to be observed with the excitation beam output from the excitation beam output unit. Fluorescence is generated in the object to be observed due to an n-photon excitation by the irradiation with the excitation beam. The harmonic detector detects a second harmonic included in a temporal waveform of a light intensity of the fluorescence.

17 Claims, 27 Drawing Sheets

(56) References Cited

OTHER PUBLICATIONS

Nguyen, Anh Dung, et al., "3D super-resolved in vitro multiphoton microscopy by saturation of excitation," Optics Express, vol. 23, No. 17, Aug. 24, 2015, pp. 22667-22675.
International Preliminary Report on Patentability mailed May 10, 2024 for PCT/JP2022/037668.

* cited by examiner (a)

(b)

(a)

(b)

MICROSCOPE AND IMAGE PROCESSING METHOD

TECHNICAL FIELD

The present disclosure relates to a microscope device and an image acquisition method.

BACKGROUND ART

Patent Literature 1 discloses a saturated excitation (SAX) microscope. In this literature, a laser beam which is an excitation beam is modulated such that a change over time in the intensity of the laser beam becomes a cosine wave.

Non Patent Literatures 1 and 2 disclose a combination of a SAX microscope and a two-photon excitation microscope. In these literatures, the intensity of the excitation beam is modulated such that a change over time in the intensity of the excitation beam becomes a sine wave.

CITATION LIST

Patent Literature

Patent Literature 1: International Publication WO 2006/061947

Non Patent Literature

Non Patent Literature 1: Sandeep Chakraborty et al., "Saturated two-photon excitation fluorescence microscopy for the visualization of cerebral neural networks at millimeters deep depth", Journal of Biophotonics, August 2018

Non Patent Literature 2: Anh Dung Nguyen et al., "3D super-resolved in vitro multiphoton microscopy by saturation of excitation", Optics Express Volume 23, Issue 17 pp. 22667 to 22675 (2015)

SUMMARY OF INVENTION

Technical Problem

Generally, in the SAX microscope, by irradiating an object to be observed with an excitation beam having a sinusoidal temporal waveform, the object to be observed is excited to output fluorescence, and by setting a peak intensity of the excitation beam to be higher than a saturation excitation intensity of the object to be observed, the peak intensity of the fluorescence is saturated. Then, a harmonic component, for example, a second harmonic included in the temporal waveform of the fluorescence is detected, and an observation image is created based on the harmonic component. Accordingly, the spatial resolution of the observation image can be increased.

In a multiphoton excitation microscope, for example, an object to be observed is irradiated with long-wavelength ultrashort-pulse light such as near-infrared light as an excitation light beam to cause multiphoton excitation such as two-photon excitation to occur in the object to be observed, and fluorescence generated accordingly is detected to create an observation image. According to the multiphoton excitation microscope, since the long-wavelength light that is excellent in transmitting through an object is used, for example, a deep portion of a biological tissue can be non-invasively observed.

By combining the SAX microscope and the multiphoton excitation microscope having the above-described respective advantages, a microscope having a combination of these advantages can be realized. However, in n-photon excitation (n is an integer of 2 or more), the fluorescence intensity is proportional to the n-th power of the excitation beam intensity. Therefore, when an object to be observed is irradiated with an excitation beam having a sinusoidal temporal waveform to cause n-photon excitation to occur in the object to be observed, the temporal waveform of fluorescence output from the object to be observed becomes proportional to the n-th-power of a sine wave. When an attempt is made to obtain an observation image based on the fluorescence intensity having such a temporal waveform, it is necessary to detect a high-order harmonic such as a third harmonic or a fifth harmonic, for example, as described in Patent Literature 2. Since there is a limitation on the frequency range of a device that detects fluorescence, the frequency of the excitation beam has to be reduced when an attempt is made to detect a high-order harmonic, so that the time required to create an observation image is increased. Alternatively, a device of which the upper limit of the frequency range is higher has to be introduced, so that the cost is increased.

The present disclosure has been made in view of such problems, and an object of the present disclosure is to provide a microscope device and an image acquisition method having the advantages of both a SAX microscope and a multiphoton excitation microscope, and capable of creating an observation image using a relatively low-order harmonic.

Solution to Problem

In order to solve the above-described problems, a microscope device according to the present disclosure includes an excitation beam output unit; an optical system; and a harmonic detector. The excitation beam output unit outputs excitation beam. A temporal waveform of a light intensity of the excitation beam includes an n-th root (n is an integer of 2 or more) of a linear function of a sine wave. A maximum value of the light intensity of the excitation beam is higher than a saturation excitation intensity of an object to be observed. The optical system irradiates the object to be observed with the excitation beam output from the excitation beam output unit. The harmonic detector detects a second harmonic included in a temporal waveform of a light intensity of fluorescence generated in the object to be observed due to an n-photon excitation by the irradiation with the excitation beam.

An image acquisition method according to the present disclosure includes an excitation beam output step; an excitation beam irradiation step; a harmonic detection step; and an image generation step. In the excitation beam output step, excitation beam is output. A temporal waveform of a light intensity of the excitation beam includes an n-th root (n is an integer of 2 or more) of a linear function of a sine wave. A maximum value of the light intensity of the excitation beam is higher than a saturation excitation intensity of an object to be observed. In the excitation beam irradiation step, an object to be observed is irradiated with the output in the excitation beam output step. In the harmonic detection step, a second harmonic included in a temporal waveform of a light intensity of fluorescence generated in the object to be observed due to an n-photon excitation by the irradiation with the excitation beam is detected. In the image generation step, an observation image of the object to be observed is generated based on the second harmonic.

In the microscope device and the image acquisition method, the temporal waveform of the excitation beam intensity includes the n-th root of a linear function of a sine wave. As described above, in n-photon excitation, the fluorescence intensity is proportional to the n-th power of the excitation beam intensity. Therefore, when the object to be observed is irradiated with the excitation beam having a temporal waveform including the n-th root of a linear function of a sine wave to cause n-photon excitation to occur in the object to be observed, the temporal waveform of the fluorescence output from the object to be observed is not proportional to the n-th power of the sine wave but to the linear function of the sine wave. Therefore, similarly to a general SAX microscope, an observation image can be obtained based on a lower-order harmonic such as a second harmonic or a third harmonic. Therefore, according to the microscope device and the image acquisition method, the need to reduce the frequency of the excitation beam due to a limitation on the frequency range of the device that detects fluorescence is eliminated, so that an increase in the time required to create an observation image can be avoided. Alternatively, a device with a low frequency range can be used, thereby leading to a reduction in cost.

In the microscope device, the excitation beam output unit may include a light source that outputs a pulsed beam, and an intensity modulation type light modulator that modulates the pulsed beam output from the light source to generate the excitation beam. Similarly, in the image acquisition method, the excitation beam output step may include an intensity modulation step of modulating a pulsed beam to generate the excitation beam. The excitation beam of which the temporal waveform of the light intensity includes the n-th root of a linear function of a sine wave can be easily generated by such a configuration and method. In this case, the light modulator may be an AO modulator.

In the microscope device, the light source may be a laser light source. Similarly, in the image acquisition method, the pulsed beam may be a laser beam. Accordingly, the excitation beam having a high light intensity that can cause n-photon excitation to occur can be generated with a simple configuration.

In the microscope device and the image acquisition method, a minimum value in each period of the temporal waveform of the light intensity of the excitation beam may be larger than 0, or may be larger than 0.1% and smaller than 20% of a maximum signal that can be received by the harmonic detector or in the harmonic detection step. At the minimum value Imin in each period of the temporal waveform of the excitation beam intensity and in the vicinity thereof, the intensity of the generated fluorescence Lb is low, and the detection result thereof is greatly affected by noise. By setting the minimum value Imin in each period of the temporal waveform of the excitation beam intensity to be larger than 0, the influence of noise is reduced, so that the detection accuracy of the second harmonic can be increased and an observation Image can be made clearer. Alternatively, by setting the minimum value in each period of the temporal waveform of the excitation beam intensity to be larger than 0.1% and smaller than 20% of the maximum signal that can be received by the harmonic detector or in the harmonic detection step, the influence of noise is reduced, so that the detection accuracy of the second harmonic can be increased and an observation image can be made clearer. When the temporal waveform of the excitation beam intensity includes the square root of a linear function of a sine wave, the rate of change in light intensity in the vicinity of the minimum value in each period increases compared to when the temporal waveform of the excitation beam intensity is a sine wave. In other words, the temporal waveform of the light intensity in the vicinity of the minimum value in each period becomes steep. When the minimum value in each period is 0, the rate of change is at its largest. By setting the minimum value in each period to be larger than 0, the rate of change in light intensity in the vicinity of the minimum value in each period is reduced, so that the steepness of the temporal waveform can be reduced. Alternatively, by setting the minimum value in each period to be larger than 0.1% and smaller than 20% of the maximum signal that can be received by the harmonic detector or in the harmonic detection step, the rate of change in light intensity in the vicinity of the minimum value in each period is reduced, so that the steepness of the temporal waveform can be reduced. Therefore, in the excitation beam output unit, shaping the temporal waveform of the excitation beam intensity, particularly, shaping the temporal waveform in the vicinity of the minimum value in each period becomes easy.

In the microscope device, the harmonic detector may include a light detection device that generates a signal according to the light intensity of the fluorescence generated in the object to be observed, and a lock-in amplifier that receives the signal from the light detection device and that outputs a second harmonic included in a temporal waveform of the signal. Similarly, in the image acquisition method, the harmonic detection step may include generating a signal according to the light intensity of the fluorescence generated in the object to be observed, and outputting a second harmonic included in a temporal waveform of the signal. The second harmonic can be easily and accurately detected by such a configuration and method.

In the microscope device, the harmonic detector may further detect a third harmonic included in the temporal waveform of the light intensity of the fluorescence generated in the object to be observed. Similarly, in the image acquisition method, in the harmonic detection step, a third harmonic included in the temporal waveform of the light intensity of the fluorescence generated in the object to be observed may be further detected. In the image generation step, an observation image of the object to be observed may be generated based on one or both of the second harmonic and the third harmonic. In this case, an observation image can be easily generated using one of the second harmonic and the third harmonic, which is suitable for the object to be observed.

In the microscope device and the image acquisition method, the temporal waveform of the light intensity of the excitation beam output from the excitation beam output unit may include a square root of a linear function of a sine wave, and in the harmonic detector and the harmonic detection step, the second harmonic included in the temporal waveform of the light intensity of the fluorescence generated in the object to be observed due to a two-photon excitation by the irradiation with the excitation beam may be detected.

An excitation beam output device according to the present disclosure is used in a fluorescence microscope that generates an observation image based on a temporal waveform of a light intensity of fluorescence generated in an object to be observed due to a two-photon excitation by irradiation with an excitation beam. The excitation beam output device outputs the excitation beam of which a temporal waveform of a light intensity includes a square root of a linear function of a sine wave and of which a maximum value of the light intensity is higher than a saturation excitation intensity of the object to be observed. An excitation method according to the present disclosure is an excitation method used in a fluorescence microscope that generates an observation image based on a temporal waveform of a light intensity of fluorescence generated in an object to be observed due to a two-photon excitation by irradiation with an excitation beam. In the excitation method, the object to be observed is excited by irradiating the object to be observed with the excitation beam of which a temporal waveform of a light intensity includes a square root of a linear function of a sine wave and of which a maximum value of the light intensity is higher than a saturation excitation intensity of the object to be observed.

In the excitation beam output device and the excitation method, the temporal waveform of the excitation beam intensity includes a square root of a linear function of a sine wave. As described above, in two-photon excitation, the fluorescence intensity is proportional to the square of the excitation beam intensity. Therefore, when the object to be observed is irradiated with the excitation beam having a temporal waveform including the square root of a linear function of a sine wave to cause two-photon excitation to occur in the object to be observed, the temporal waveform of the fluorescence output from the object to be observed is not proportional to the square of the sine wave but to the linear function of the sine wave. Therefore, an observation image can be obtained based on a lower-order harmonic such as a second harmonic or a third harmonic. Therefore, according to the excitation beam output device and the excitation method, the need to reduce the frequency of the excitation beam due to a limitation on the frequency range of the device that detects fluorescence is eliminated, so that an increase in the time required to create an observation image can be avoided. Alternatively, a device with a low frequency range can be used, thereby leading to a reduction in cost.

Advantageous Effects of Invention

According to the present disclosure, it is possible to provide the microscope device and the image acquisition method having the advantages of both a SAX microscope and a multiphoton excitation microscope, and capable of creating an observation image using a relatively low-order harmonic.

DESCRIPTION OF EMBODIMENTS

Hereinafter, embodiments of a microscope device and an image acquisition method according to the present disclosure will be described in detail with reference to the accompanying drawings. In the description of the drawings, the same elements are denoted by the same reference signs, and duplicate descriptions will not be repeated.

First Embodiment

Figure 1:
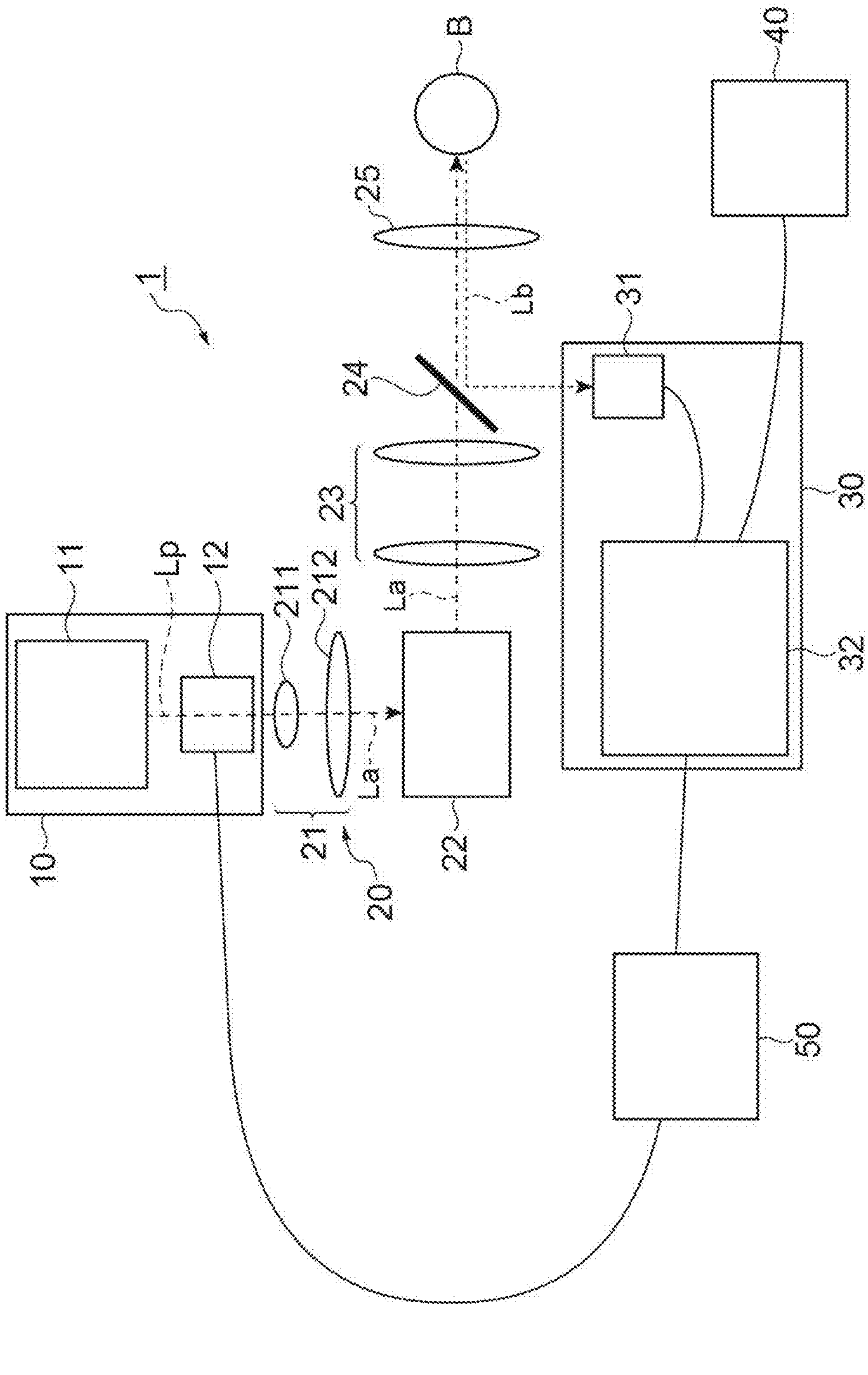
FIG. 1 is a diagram showing a configuration of a microscope device.

FIG. 1 is a diagram showing a configuration of a microscope device 1 according to a first embodiment of the present disclosure. The microscope device 1 is a device that acquires an image of an object B to be observed, and includes an excitation beam output unit (excitation beam output device) 10, an optical system 20, a harmonic detector 30, an image generator 40, and a signal generator (function generator) 50. The object B to be observed is, for example, a biological sample.

The excitation beam output unit 10 outputs an excitation beam La for exciting the object B to be observed. The excitation beam La is coherent beam or incoherent beam. A wavelength of the excitation beam La is included in, for example, the near-infrared region. Specifically, the wavelength of the excitation beam La is, for example, within a range of 650 nm to 1800 nm. The excitation beam La is, for example, a laser beam. The following formula (1) is an expression that shows a temporal waveform of the excitation beam La. In Formula (3), Ir is the light intensity of the excitation beam La, t is time, f is frequency, and a and b are constants.

[Formula 1]

$$I_r=\sqrt{a\cdot\sin(2\pi f\cdot t)+b)} \quad (1)$$

As shown in Formula (1), the temporal waveform of the excitation beam La includes the square root of a linear function of a sine wave. Formula (2) is a formula that shows the case of a=1/2, f=1/2π, and b=1/2 as one example of the temporal waveform of the excitation beam La.

[Formula 2]

$$I_r=\sqrt{\left(\frac{\sin t+1}{2}\right)} \quad (2)$$

Figure 2:
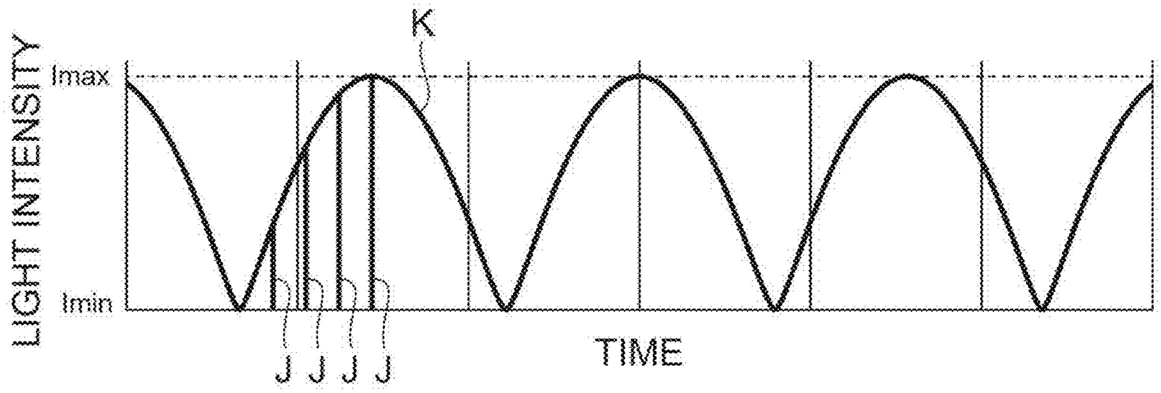
FIG. 2 is a diagram showing a temporal waveform of an excitation beam.

FIG. 2 is a diagram conceptually showing one example of the temporal waveform of the excitation beam La shown in Formula (1). In FIG. 2, the vertical axis represents the light intensity (power) of the excitation beam La, and the horizontal axis represents time. The temporal waveform of the excitation beam La shown in FIG. 2 periodically repeats between a minimum value Imin of the light intensity and a maximum value Imax of the light intensity. The rate of change over time in the vicinity of the maximum value Imax, namely, the peak value of the light intensity in each period is relatively small, and a change over time in the vicinity of the peak value is gentle. On the other hand, the rate of change over time in the minimum value Imin, namely, the bottom value of the light intensity in each period is relatively large, and a change over time in the vicinity of the bottom value is steep. The maximum value Imax of the light intensity of the excitation beam La in each period is set to a size larger than a saturation excitation intensity of the object B to be observed. The excitation beam output unit 10 generates the excitation beam La of which the light intensity changes periodically in such a manner, in synchronization with a periodic signal from the signal generator 50. A period of the temporal waveform of the excitation beam La is approximately 1 MHz to several GHz, and in one example, is 80 MHz. In FIG. 2, the temporal waveform of the period is shown as a pulse group including a plurality of pulses J arranged in a comb shape and having different intensities. In the diagram, only some pulses J among the plurality of pulses J are shown. On the other hand, a period of an envelope K connecting the peaks of the plurality of pulses J included in the pulse group is, for example, approximately several tens of kHz to several hundred kHz. In one example, a frequency of the envelope K is 200 kHz or less. In addition, in another example, the frequency of the envelope K is 1 MHz or less. The frequency f refers to the frequency of the envelope K.

The excitation beam output unit 10 in one embodiment includes a light source 11 and a light modulator 12. The light source 11 outputs a pulsed beam Lp. The light source 11 outputs the pulsed beam Lp having, for example, a temporal width on the order of picoseconds or femtoseconds. Here, the temporal width of the pulsed beam Lp is, for example, a time for which the light intensity of the pulsed beam Lp is higher than half the peak value. Specifically, the temporal width of the pulsed beam Lp is, for example, within a range of 10 femtoseconds to 50 picoseconds. The light source 11 is, for example, a laser light source, and in one example, is a mode-locked laser light source. Alternatively, the light source 11 may be an incoherent light source such as a light-emitting diode. The preferred wavelength range of the pulsed beam Lp is the same as the preferred wavelength range of the excitation beam La described above.

The light modulator 12 is an intensity modulation type light modulator. The light modulator 12 is optically coupled to the light source 11 via a space or an optical waveguide. The light modulator 12 is electrically connected to the signal generator 50. The light modulator 12 modulates the pulsed beam Lp, which is output from the light source 11, to generate the excitation beam La. The modulation of the pulsed beam Lp in the light modulator 12 is synchronized with an output signal from the signal generator 50. For example, the light modulator 12 can be selected from various modulators such as an electro-optic (EO) modulator, an acousto-optic (AO) modulator, and a liquid crystal or neutral density (ND) filter capable of dynamically controlling the transmittance or reflectance. When the temporal width of the pulsed beam Lp is on the order of femtoseconds, an AO modulator is particularly preferred as the light modulator 12. The excitation beam La may be generated by controlling the magnitude of a drive current input to the light source 11, namely, a direct modulation method, instead of using the light modulator 12. In that case, the light modulator 12 is unnecessary.

The optical system 20 is optically coupled to the excitation beam output unit 10 via a space. The optical system 20 irradiates the object B to be observed with the excitation beam La output from the excitation beam output unit 10. In one embodiment, the optical system 20 includes a beam expander 21, an optical scanner 22, a relay lens system 23, a dichroic mirror 24, and an objective lens 25.

The beam expander 21 is optically coupled to the excitation beam output unit 10 via a space, and expands the beam diameter of the excitation beam La output from the excitation beam output unit 10. The beam expander 21 includes, for example, a pair of lenses 211 and 212 optically coupled to each other. One lens 211 is provided at the front stage, namely, closer to the excitation beam output unit 10 than the other lens 212, and the other lens 212 is provided at the rear stage, namely, further away from the excitation beam output unit 10 than the one lens 211. The lens 211 at the front stage diffuses the excitation beam La, and the lens 212 at the rear stage collimates the excitation beam La. The lenses 211 and 212 are, for example, glass lenses.

The optical scanner 22 is optically coupled to the beam expander 21 via a space. The optical scanner 22 scans the irradiation position of the excitation beam La on the object B to be observed by moving an optical axis of the excitation beam La in a plane perpendicular to the optical axis of the excitation beam La. The optical scanner 22 can be formed of various optical scanners such as a galvano scanner, a resonant mirror, or a polygon mirror. In one example, the optical scanner 22 is a two-axis galvano scanner.

Figure 3:
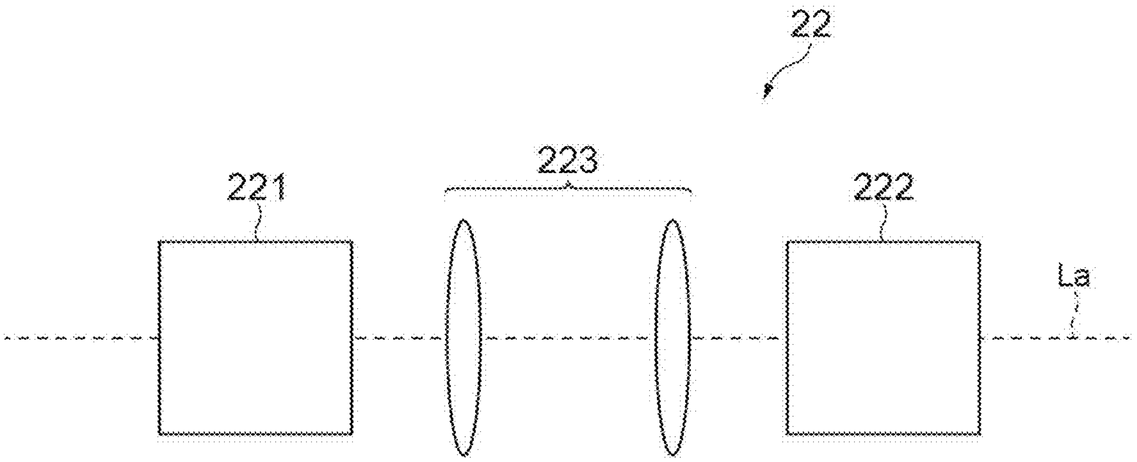
FIG. 3 is a diagram showing a configuration of an optical scanner.

FIG. 3 is a diagram showing another example of the optical scanner 22. The optical scanner 22 shown in FIG. 3 includes two scanners 221 and 222. Both the scanners 221 and 222 are single-axis scanners. A scanning direction of the scanner 221 and a scanning direction of the scanner 222 are orthogonal to each other. The scanner 221 and the scanner 222 are optically coupled to each other via an optical system 223 such as a relay lens. The scanners 221 and 222 are, for example, galvano scanners. In such a manner, the optical scanner 22 may be configured by combining a plurality of single-axis scanners. The irradiation position of the excitation beam La on the object B to be observed may be scanned by moving a stage, on which the object B to be observed is placed, in a plane perpendicular to the optical axis of the excitation beam La. In that case, the optical scanner 22 may not be provided.

The relay lens system 23 is provided on an optical path between the optical scanner 22 and the objective lens 25, and optically couples the optical scanner 22 and the objective lens 25 to each other. The relay lens system 23 is, for example, a telecentric relay lens system. When the optical scanner 22 and the objective lens 25 are extremely close to each other, the relay lens system 23 can also be omitted.

The dichroic mirror 24 transmits one of the excitation beam La from the optical scanner 22 and fluorescence Lb from the object B to be observed, and reflects the other. In the example shown in FIG. 1, the dichroic mirror 24 transmits the excitation beam La and reflects the fluorescence Lb. In the example shown in FIG. 1, the dichroic mirror 24 is provided on an optical path between the relay lens system 23 and the objective lens 25. The dichroic mirror 24 may be provided between the optical scanner 22 and the relay lens system 23, or may be provided between the beam expander 21 and the optical scanner 22.

The objective lens 25 is disposed to face the object B to be observed, and focuses the excitation beam La inside the object B to be observed. The relative distance between the objective lens 25 and the object B to be observed is variable. The objective lens 25 may be movable along an optical axis direction of the excitation beam La, and the stage (not shown) on which the object B to be observed is placed may be movable along the optical axis direction of the excitation beam La. A mechanism for moving the objective lens 25 or the object B to be observed can be formed of, for example, a stepping motor or a piezo actuator. The disposition of the objective lens 25 with respect to the object B to be observed may be upright or inverted.

The objective lens 25 focuses the excitation beam La on the object B to be observed with high density to cause two-photon excitation to occur on the object B to be observed, thereby causing the fluorescence Lb to be generated from the object B to be observed. A wavelength of the fluorescence Lb is, for example, within a range of 350 nm to 900 nm. The objective lens 25 also has a function of collecting the fluorescence Lb from the object B to be observed. In the shown example, the objective lens 25 serves as both an objective lens for the excitation beam La and a lens for collecting the fluorescence Lb in such a manner. The objective lens for the excitation beam La and the lens for collecting the fluorescence Lb may be separately provided. For example, an objective lens having a high numerical aperture (NA) may be used for the excitation beam La to locally focus the excitation beam La through aberration correction. An objective lens having a large pupil may be used for the fluorescence Lb to extract more light. The objective lens for the excitation beam La and the lens for collecting the fluorescence Lb are disposed to interpose the object B to be observed therebetween, so that the fluorescence Lb emitted from a surface on an opposite side of the object B to be observed from an incident surface of the excitation beam La is acquired. In that case, the dichroic mirror 24 becomes unnecessary.

The harmonic detector 30 detects a second harmonic (or the second harmonic and a third harmonic) included in the temporal waveform of the light intensity of the fluorescence Lb. In one embodiment, the harmonic detector 30 includes a light detection device 31 and a lock-in amplifier 32. The light detection device 31 is optically coupled to the dichroic mirror 24. Alternatively, when an objective lens for focusing the excitation beam La and an objective lens for collecting the fluorescence Lb are separately provided, the light detection device 31 is optically coupled to the objective lens for collecting the fluorescence Lb. The light detection device 31 generates an electrical signal according to the light intensity of the fluorescence Lb generated in the object B to be observed. The light detection device 31 is sensitive to the wavelength of the fluorescence Lb and has a frequency range required to detect the second harmonic or both the second harmonic and the third harmonic of the fluorescence Lb. The light detection device 31 can be selected from one-dimensional light detection elements such as a photomultiplier tube and an avalanche photodiode. Alternatively, various two-dimensional light detection elements such as a multi-anode photomultiplier tube (PMT), a CCD image sensor, or a CMOS image sensor may be selected as the light detection device 31. A filter that cuts the wavelength of the excitation beam La and wavelengths unnecessary for observation may be provided on an optical path between the harmonic detector 30 and the dichroic mirror 24 (or the lens for collecting the fluorescence Lb).

The lock-in amplifier 32 is electrically connected to the light detection device 31 and the signal generator 50. The lock-in amplifier 32 receives an electrical signal corresponding to the light intensity of the fluorescence Lb from the light detection device 31. In addition, the lock-in amplifier 32 receives a sine wave signal, which has the same period as the periodic signal provided to the excitation beam output unit 10, from the signal generator 50. The lock-in amplifier 32 detects a second harmonic or both the second harmonic and a third harmonic included in the temporal waveform of the signal from the light detection device 31 while using the sine wave signal from the signal generator 50 as a reference.

The image generator 40 is electrically connected to the lock-in amplifier 32. The image generator 40 receives a signal related to the magnitude of the second harmonic, which is included in the temporal waveform of the light intensity of the fluorescence Lb, from the lock-in amplifier 32, and generates an observation image of the object B to be observed based on the second harmonic. Alternatively, the image generator 40 receives a signal related to the magnitude of both the second harmonic and the third harmonic, which are included in the temporal waveform of the light intensity of the fluorescence Lb, from the lock-in amplifier 32, and generates an observation image of the object B to be observed based on one or both of the second harmonic and the third harmonic. The image generator 40 can be formed of, for example, a computer including a central processing unit (CPU) and a memory. The image generator 40 may further include a monitor that displays the generated image.

Figure 4:
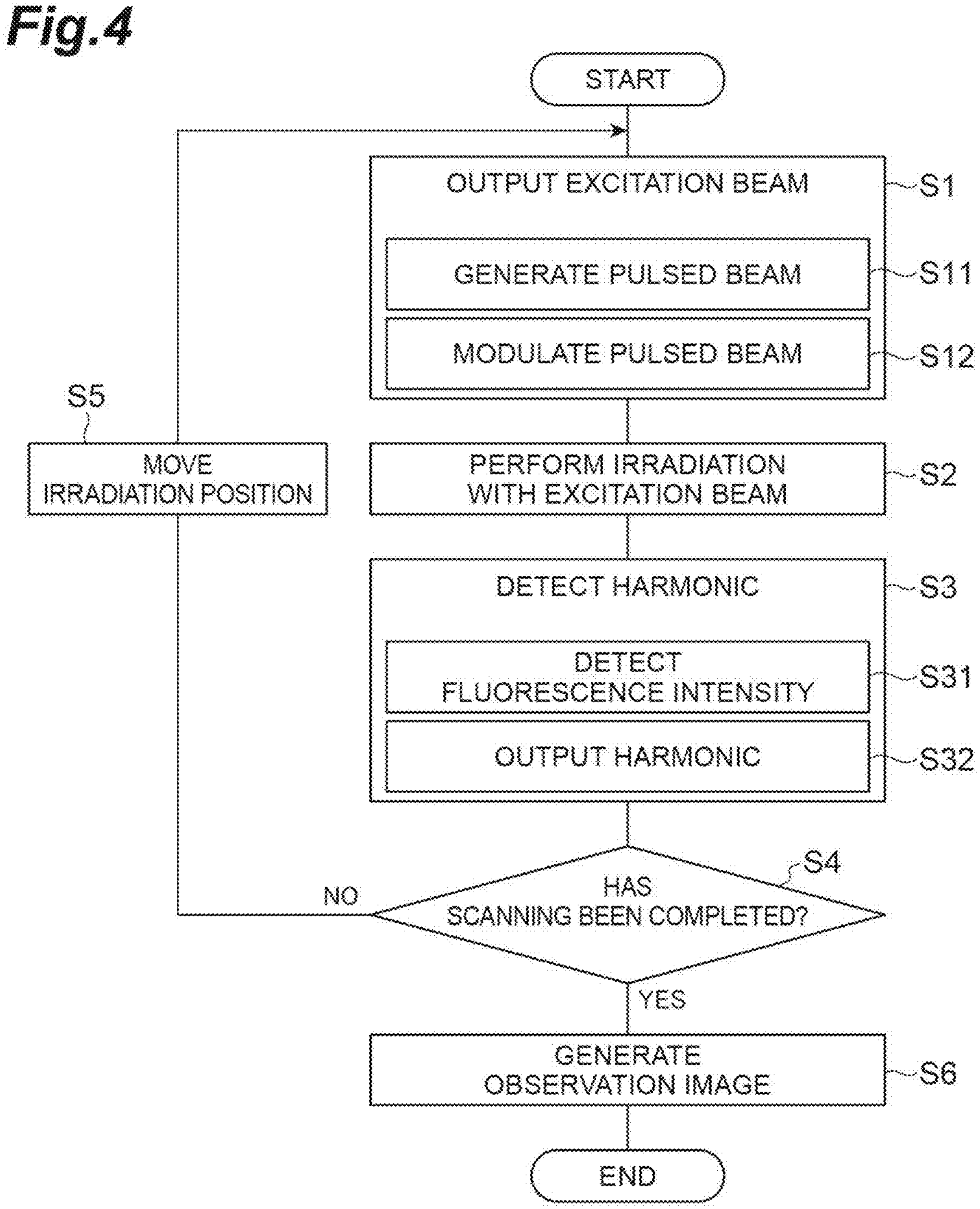
FIG. 4 is a flowchart for describing operation of the microscope device.

FIG. 4 is a flowchart for describing operation of the microscope device 1 according to the present embodiment. An image acquisition method according to the present embodiment will be described with reference to FIG. 4, together with the operation of the microscope device 1.

First, an excitation beam output step S1 is performed. In the excitation beam output step S1, the excitation beam output unit 10 outputs the excitation beam La. As described above, the temporal waveform of the light intensity of the excitation beam La includes the square root of a linear function of a sine wave (refer to Formula (1)). The maximum value Imax of the light intensity of the excitation beam La in each period is larger than the saturation excitation intensity of the object B to be observed. The excitation beam output step S1 may include step S11 in which the light source 11 generates the pulsed beam Lp, and an intensity modulation step S12 in which the light modulator 12 modulates the pulsed beam Lp to generate the excitation beam La.

Next, an excitation beam irradiation step S2 is performed. In the excitation beam irradiation step S2, the object B to be observed is irradiated with the excitation beam La output in the excitation beam output step S1, via the beam expander 21, the optical scanner 22, the relay lens system 23, the dichroic mirror 24, and the objective lens 25. The fluorescence Lb is generated in the object B to be observed due to two-photon excitation by the irradiation with the excitation beam La.

Subsequently, a harmonic detection step S3 is performed. In the harmonic detection step S3, the harmonic detector 30 detects the second harmonic or both the second harmonic and the third harmonic included in the temporal waveform of the light intensity of the fluorescence Lb. The harmonic detection step S3 may include step S31 and step S32. In step S31, the light detection device 31 generates a signal according to the light intensity of the fluorescence Lb generated in the object B to be observed. In step S32, the lock-in amplifier 32 outputs the second harmonic or both the second harmonic and the third harmonic included in the temporal waveform of the signal generated by the light detection device 31.

The excitation beam output step S1, the excitation beam irradiation step S2, and the harmonic detection step S3 are repeatedly performed while scanning the irradiation position of the excitation beam La on the object B to be observed using the optical scanner 22 (steps S4 and S5). Accordingly, data regarding the magnitude of the second harmonic or both the second harmonic and the third harmonic at a plurality of positions on the object B to be observed is obtained.

After the scanning by the optical scanner 22 is completed (step S4: YES), an image generation step S6 is performed. When the second harmonic included in the temporal waveform of the light intensity of the fluorescence Lb is detected in the harmonic detection step S3, in the image generation step S6, the image generator 40 generates observation images of the object B to be observed at a plurality of the irradiation positions of the excitation beam La based on the magnitude of the second harmonic included in the temporal waveform of the light intensity of the fluorescence Lb. When both the second harmonic and the third harmonic included in the temporal waveform of the light intensity of the fluorescence Lb are detected in the harmonic detection step S3, in the image generation step S6, the image generator 40 generates observation images of the object B to be observed at the plurality of irradiation positions of the excitation beam La based on the magnitude of one or both of the second harmonic and the third harmonic included in the temporal waveform of the light intensity of the fluorescence Lb.

Effects of the microscope device 1 and the image acquisition method of the present embodiment described above will be described together with problems of the microscope device in the related art.

Figure 5:
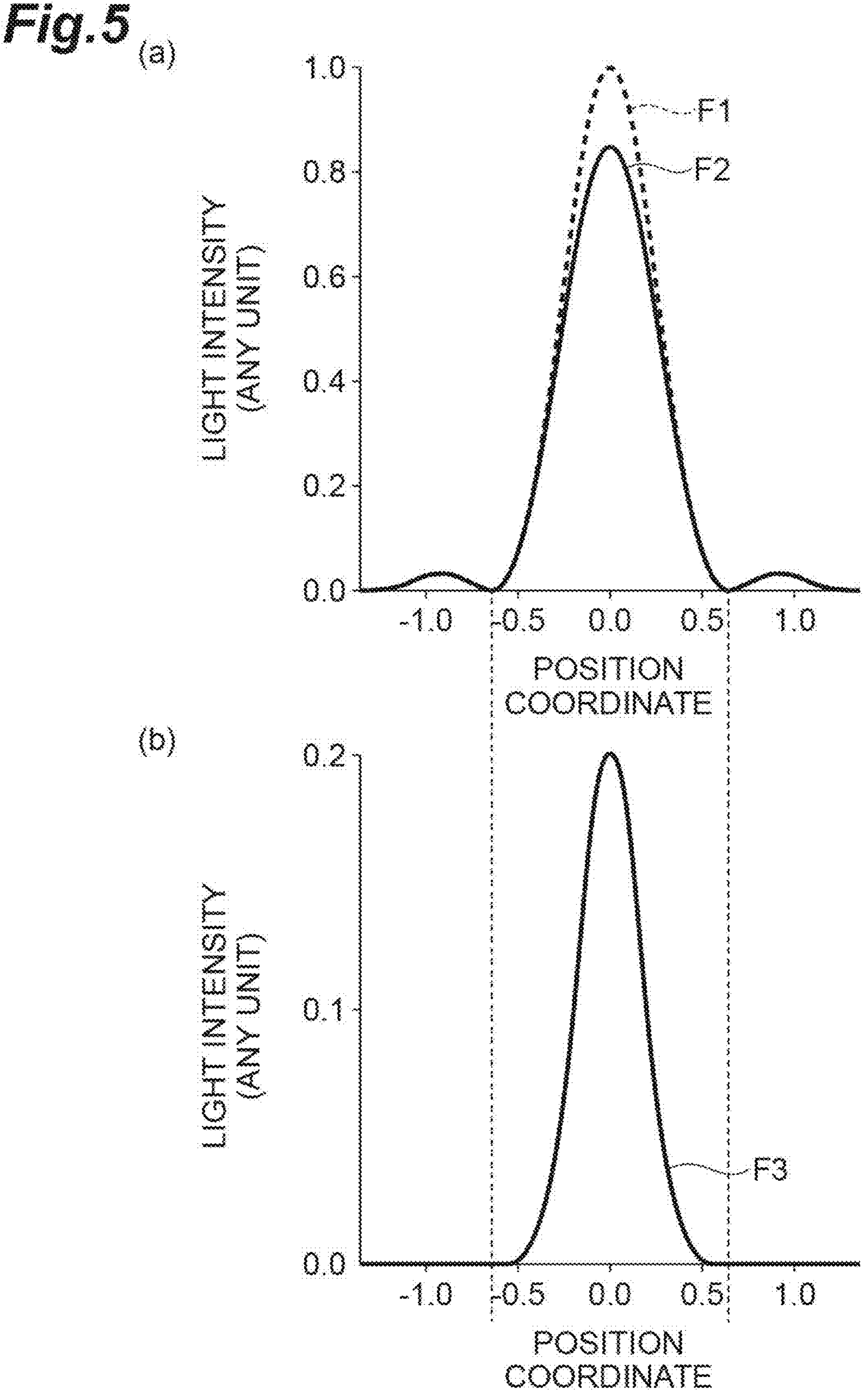
FIG. 5 includes (a) a diagram conceptually showing a fluorescence intensity distribution in a SAX microscope, and (b) a diagram conceptually showing a difference between the theoretical value and the measured value of the fluorescence intensity.

FIG. 5(*a*) is a diagram showing one example of a fluorescence intensity distribution in a SAX microscope. In the SAX microscope, the peak intensity of an excitation beam is made higher than a saturation excitation intensity of an object to be observed. Accordingly, the fluorescence intensity within a certain range from the center of the fluorescence intensity distribution becomes saturated, and the shape of the fluorescence intensity distribution (refer to solid line F2 in the diagram) changes from a theoretical value when there is no saturation (refer to broken line F1 in the diagram). Therefore, by obtaining a difference between the theoretical value and the measured value of the fluorescence intensity (refer to solid line F3 in FIG. 5(*b*)), the full width at half maximum of the intensity distribution can be reduced and the spatial resolution of the microscope can be increased. In the case of single-photon excitation, the difference between the theoretical value and the measured value of the fluorescence intensity or a value that approximates the difference is obtained by shaping the temporal waveform of the excitation beam intensity into a sine wave form and by detecting a harmonic, for example, the second harmonic or the third harmonic of the temporal waveform of the fluorescence intensity.

In a two-photon excitation microscope, for example, an object to be observed is irradiated with long-wavelength ultrashort-pulse light such as near-infrared light as an excitation light beam to cause two-photon excitation to occur in the object to be observed, and fluorescence generated accordingly is detected to create an observation image. According to the two-photon excitation microscope, since the long-wavelength light that is excellent in transmitting through an object is used, for example, a deep portion of a biological tissue can be non-invasively observed.

Figure 6:
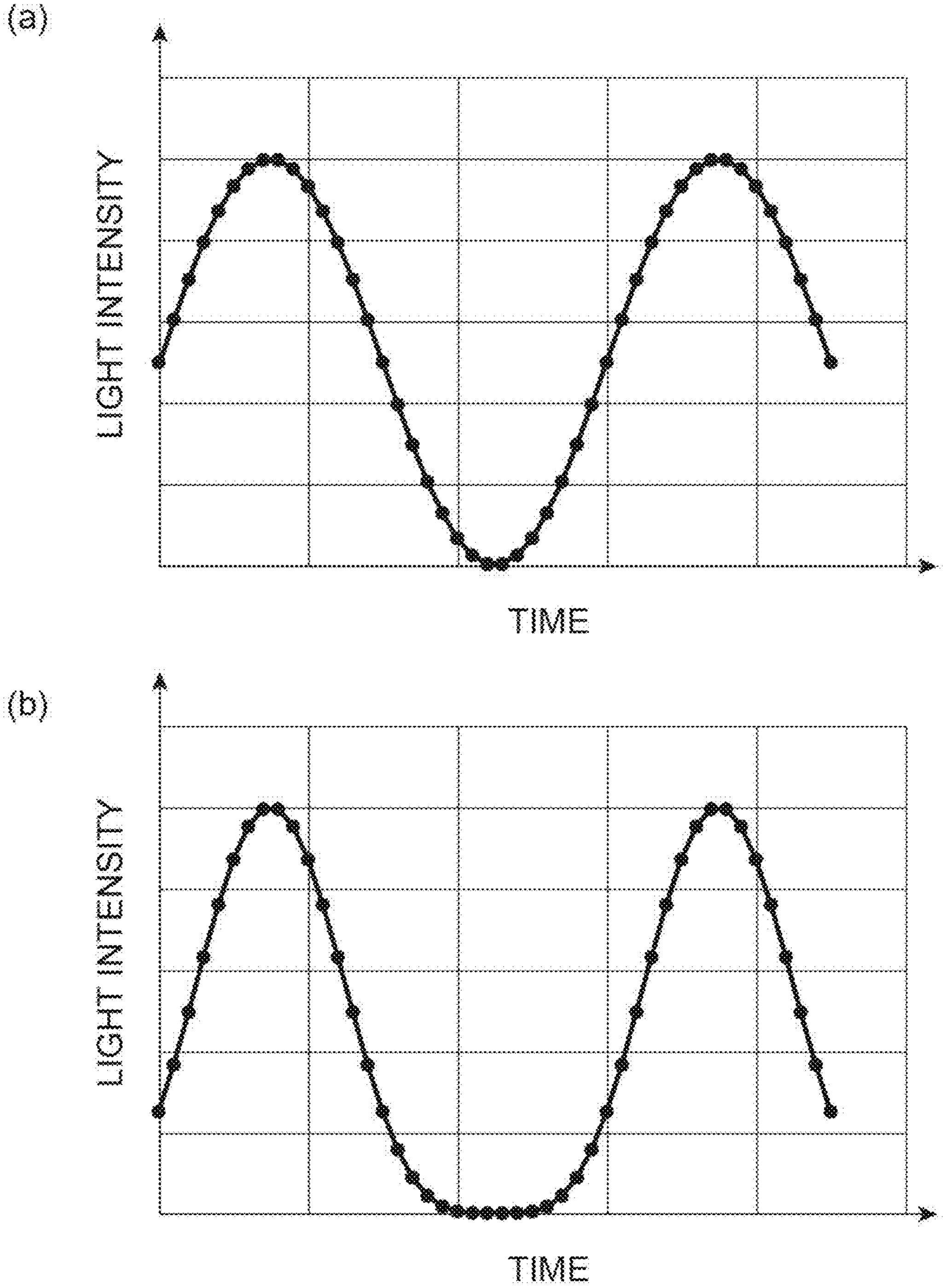
FIG. 6 includes (a) a diagram conceptually showing a temporal waveform of an excitation beam intensity, and (b) a diagram conceptually showing a temporal waveform of a fluorescence intensity.

If the SAX microscope and the two-photon excitation microscope having the above-described respective advantage can be combined, a microscope having a combination of these advantages is realized. However, in two-photon excitation, the fluorescence intensity is proportional to the square of the excitation beam intensity. Therefore, when an object to be observed is irradiated with an excitation beam having a sinusoidal temporal waveform to cause two-photon excitation to occur in the object to be observed, the temporal waveform of the excitation beam output from the object to be observed becomes proportional to the square of the sine wave. FIG. 6 is a diagram conceptually showing the temporal waveform of the excitation beam intensity (refer to FIG. 6(*a*)) and the temporal waveform of the fluorescence intensity (refer to FIG. 6(*b*)) in the case of two-photon excitation. When an attempt is made to obtain an observation image based on the fluorescence intensity having a temporal waveform modified from a sine wave as shown in FIG. 6(*b*), for example, as described in Patent Literature 2, it is necessary to detect a high-order harmonic such as the third harmonic and a fifth harmonic. Since there is a limitation on the maximum value of the frequency range of a device that detects an excitation beam, for example, the lock-in amplifier 32, the frequency of the excitation beam has to be reduced when an attempt is made to detect a high-order harmonic, so that the time required to create an observation image is increased. Alternatively, a device of which the upper limit of the frequency range is higher has to be introduced, so that the cost is increased.

Figure 7:
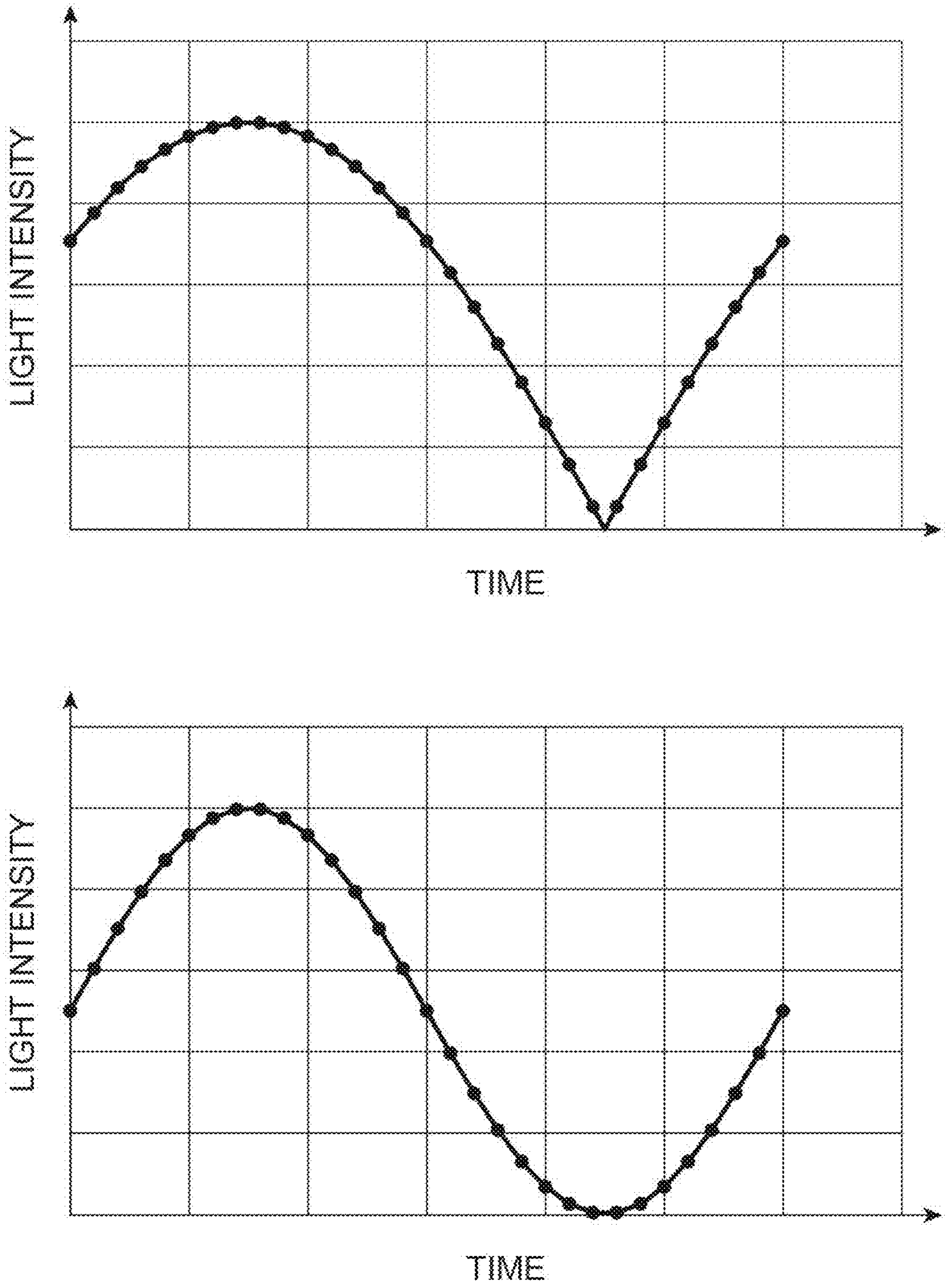
FIG. 7 includes (a) a diagram conceptually showing a temporal waveform of the excitation beam intensity, and (b) a diagram conceptually showing a temporal waveform of the fluorescence intensity.

In the microscope device 1 and the image acquisition method of the present embodiment, the temporal waveform of the light intensity of the excitation beam La includes the square root of a linear function of a sine wave (refer to Formula (1)). As described above, in two-photon excitation, the light intensity of the fluorescence Lb is proportional to the square of the light intensity of the excitation beam La. Therefore, when the object B to be observed is irradiated with the excitation beam La having a temporal waveform including the square root of a linear function of a sine wave to cause two-photon excitation to occur in the object B to be observed, the temporal waveform of the excitation beam La output from the object B to be observed is not proportional to the square of the sine wave but to the linear function of the sine wave. FIG. 7 is a diagram conceptually showing the temporal waveform of such an excitation beam intensity (refer to FIG. 7(*a*)) and the temporal waveform of the fluorescence intensity (refer to FIG. 7(*b*)).

Therefore, according to the microscope device 1 and the image acquisition method of the present embodiment, similarly to a general SAX microscope, an observation image can be obtained based on a lower-order harmonic such as the second harmonic or the third harmonic. Accordingly, the need to reduce the frequency of the excitation beam La due to a limitation on the frequency range of the light detection device 31 is eliminated, so that an increase in the time required to create an observation image can be avoided. Alternatively, a device of which the upper limit of the frequency range is lower can be used, thereby leading to a reduction in cost.

In order to verify the above-described effects, the inventors measured the light intensity of the fluorescence Lb in the microscope device 1 of the present embodiment. In addition, for comparison, the inventors measured the fluorescence intensity by shaping the temporal waveform of the excitation beam intensity into a sine wave. In these measurements, the excitation beam intensity and the wavelength of the excitation beam were kept the same, and the same object B to be observed was used.

Figure 8:
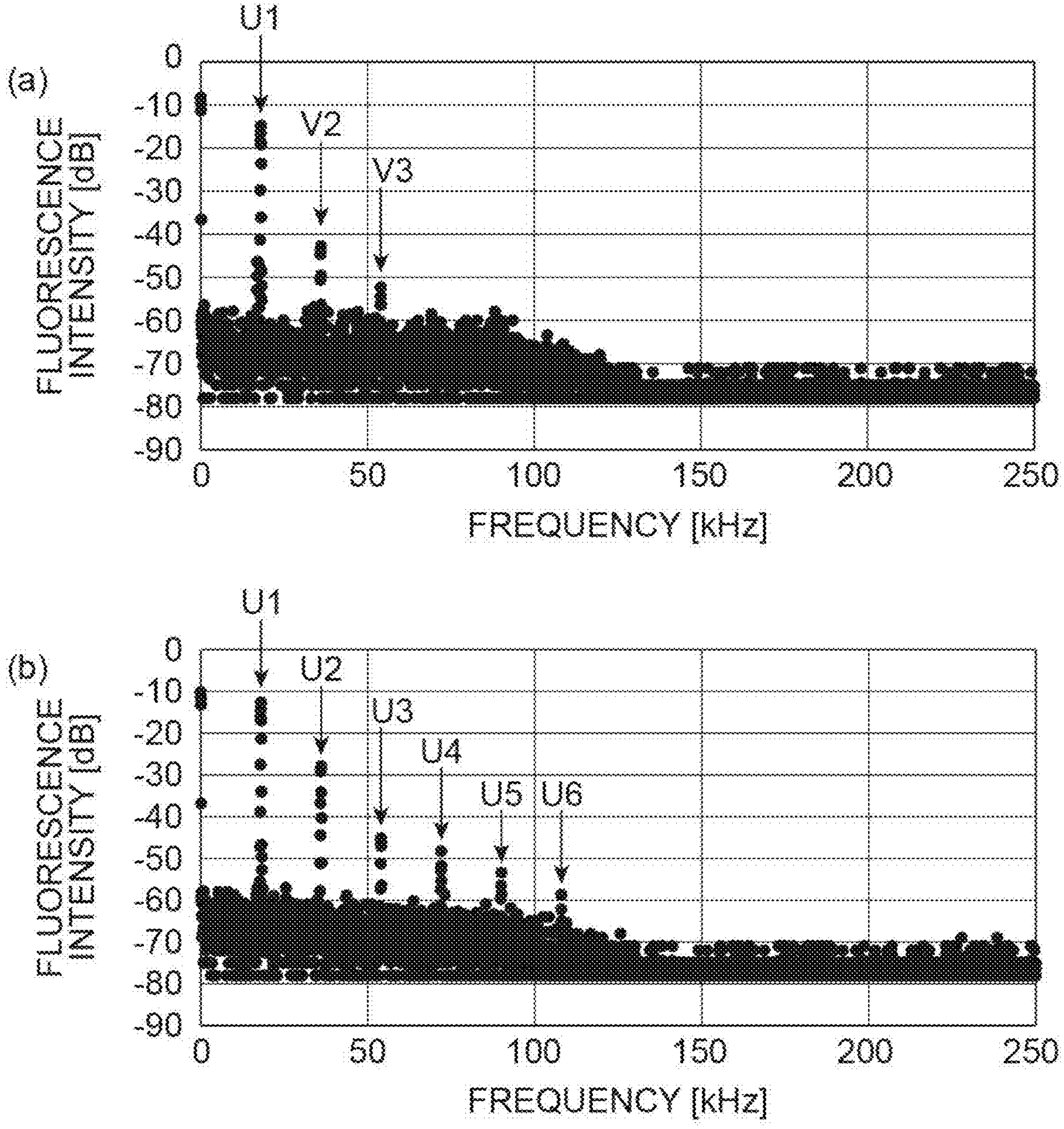
FIG. 8 includes (a) a graph showing the result of Fourier transformation of the temporal waveform of the light intensity of fluorescence measured in the microscope device, and (b) a graph showing the result of Fourier transformation of the temporal waveform of the fluorescence intensity measured when the temporal waveform of the excitation beam intensity is a sine wave.

FIG. 8(*a*) is a graph showing the result of Fourier transformation of the temporal waveform of the light intensity of the fluorescence Lb measured in the microscope device 1 of the present embodiment. FIG. 8(*b*) is a graph showing the result of Fourier transformation of the temporal waveform of the fluorescence intensity measured when the temporal waveform of the excitation beam intensity is a sine wave. Arrow U1 in FIGS. 8(*a*) and 8(*b*) indicates a fundamental wave, and only the fundamental wave is generated when there is no saturation. When the excitation beam intensity is set to a magnitude at which saturation occurs and the temporal waveform thereof is a sine wave, as shown in FIG. 8(*b*), in addition to the fundamental wave, a second harmonic (arrow U2), a third harmonic (arrow U3), a fourth harmonic (arrow U4), a fifth harmonic (arrow U5), and a sixth harmonic (arrow U6) are generated due to saturation. On the other hand, in the microscope device 1 of the present embodiment, as shown in FIG. 8(*a*), in addition to the fundamental wave, a second harmonic (arrow V2) and a third harmonic (arrow V3) are generated due to saturation. In the measurement results, the fluorescence intensity of the second harmonic (arrow V2) in FIG. 8(*a*) is approximately equal to the fluorescence intensity of the third harmonic (arrow U3) in FIG. 8(*b*). In addition, the fluorescence intensity of the third harmonic (arrow V3) in FIG. 8(*a*) is approximately equal to the fluorescence intensity of the fifth harmonic (arrow U5) in FIG. 8(*b*).

Figure 9:
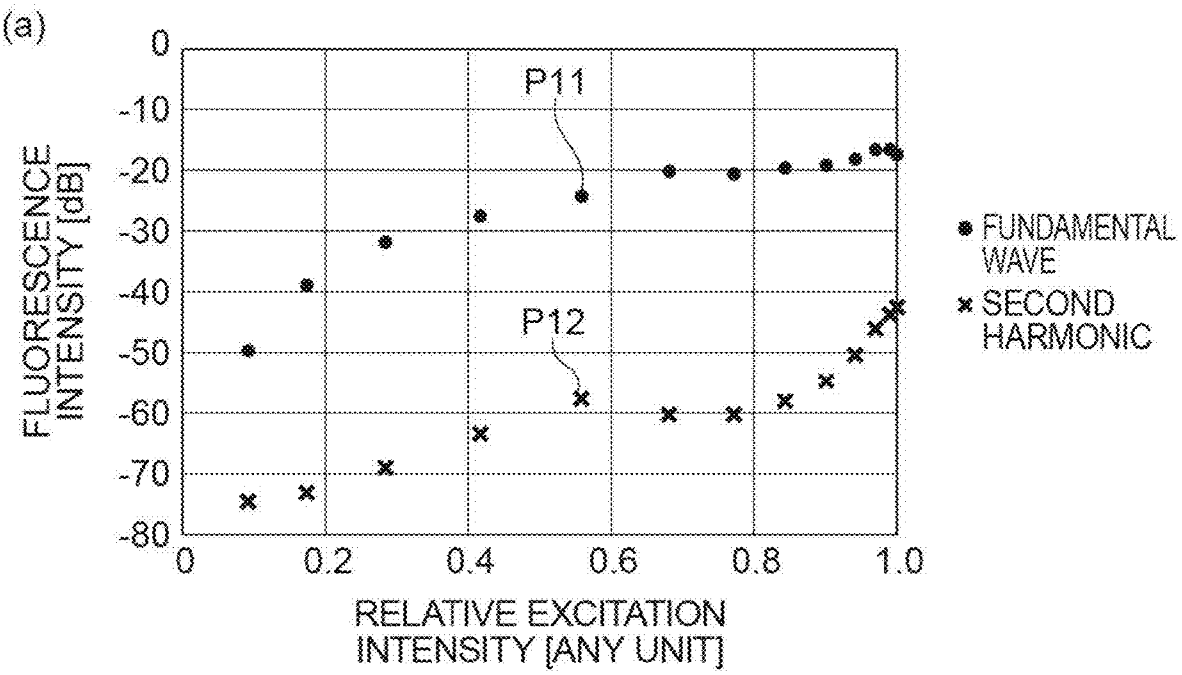
FIG. 9 includes (a) a graph showing a relationship between the light intensities of the fundamental wave and the second harmonic of the fluorescence measured in the microscope device and the relative intensity of the excitation beam, and (b) a graph showing a relationship between the light intensities of the fundamental wave, the second harmonic, and the third harmonic of the fluorescence measured when the temporal waveform of the excitation beam intensity is a sine wave and the relative intensity of the excitation beam.
Figure 9:
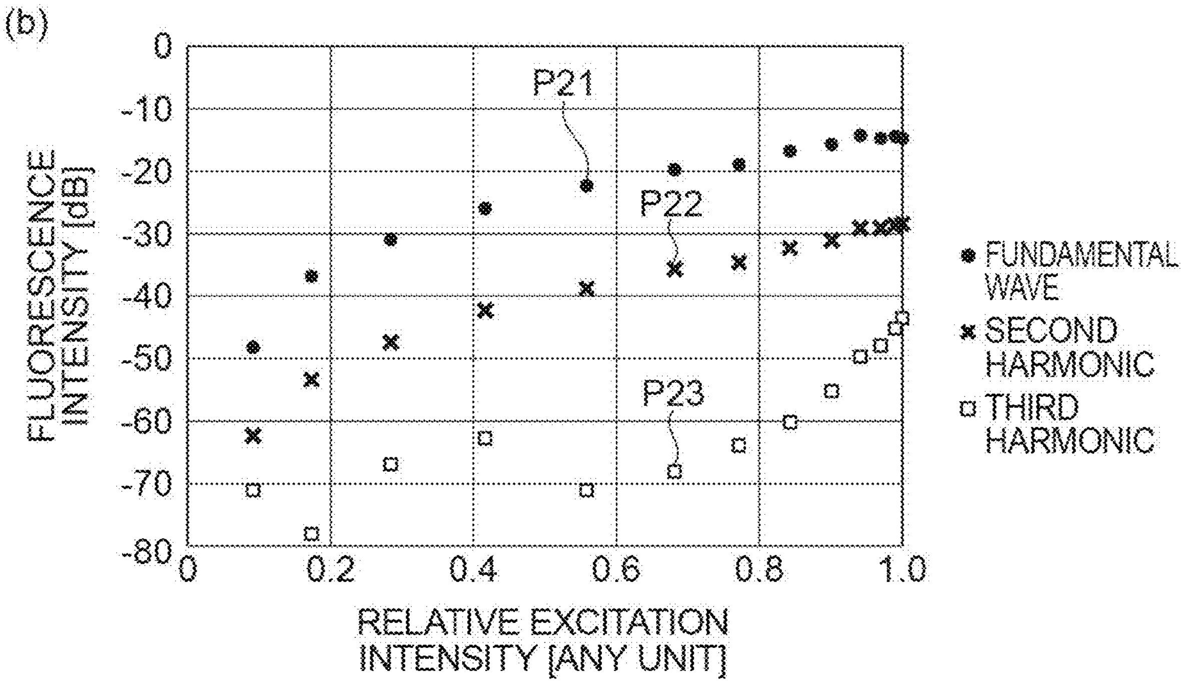

FIG. 9(*a*) is a graph showing a relationship between the light intensities (fluorescence intensities) of the fundamental wave and the second harmonic of the fluorescence Lb measured in the microscope device 1 of the present embodiment and the relative intensity (relative excitation intensity) of the excitation beam La. In FIG. 9(*a*), plot P11 shows the fundamental wave, and plot P12 shows the second harmonic. FIG. 9(*b*) is a graph showing a relationship between the light intensities (fluorescence intensities) of the fundamental wave, the second harmonic, and the third harmonic of the fluorescence measured when the temporal waveform of the excitation beam intensity is a sine wave and the relative intensity (excitation beam intensity) of the excitation beam. In FIG. 9(*b*), plot P21 shows the fundamental wave, plot P22 shows the second harmonic, and plot P23 shows the third harmonic. The relative intensity of the excitation beam is the intensity of the periodic excitation beam La after being output from the light modulator 12, and is a ratio when the maximum intensity that can be output by the light modulator 12 is set to 1. When FIG. 9(*a*) and FIG. 9(*b*) are compared to each other, it can be seen that the disposition of plot P12 in FIG. 9(*a*) is approximately similar to the disposition of plot P23 in FIG. 9(*b*). Namely, the disposition of the plot of the second harmonic of the fluorescence Lb measured in the microscope device 1 of the present embodiment is approximately similar to the disposition of the plot of the third harmonic of the fluorescence measured when the temporal waveform of the excitation beam intensity is a sine wave. It is considered that the reason that in a region where the fluorescence intensity is low, the disposition of plot P12 is not similar to the disposition of plot P23 is due to measurement errors.

From the measurement results shown above, in the microscope device 1 of the present embodiment in which the temporal waveform of the light intensity of the excitation beam La includes the square root of a linear function of a sine wave, it can be seen that the detection of the second harmonic (or the third harmonic) corresponds to the detection of the third harmonic (or the fifth harmonic) when the temporal waveform of the excitation beam intensity is a sine wave. Namely, according to the microscope device 1 of the present embodiment, an observation image can be obtained based on a lower-order harmonic compared to when the temporal waveform of the excitation beam intensity is a sine wave. Generally, in many cases, a device of which the upper limit of the frequency range is lower is cheaper than a device of which the upper limit is higher, so that a reduction in cost can be achieved.

As in the present embodiment, the excitation beam output unit 10 may include the light source 11 that outputs the pulsed beam Lp, and the intensity modulation type light modulator 12 that modulates the pulsed beam Lp, which is output from the light source 11, to generate the excitation beam La. Similarly, the excitation beam output step S1 may include the intensity modulation step S12 of modulating the pulsed beam Lp to generate the excitation beam La. Accordingly, the excitation beam La of which the temporal waveform of the light intensity includes the square root of a linear function of a sine wave can be easily generated. The intensity modulation type light modulator 12 may be an AO modulator. The AO modulator is suitable for modulating high-speed and non-sinusoidal light as in the present embodiment.

As in the present embodiment, the light source 11 may be a laser light source, and the pulsed beam Lp may be a laser beam. Accordingly, the excitation beam La having a high light intensity that can cause two-photon excitation to occur can be generated with a simple configuration.

As in the present embodiment, the harmonic detector 30 may include the light detection device 31 that generates a signal according to the light intensity of the fluorescence Lb generated in the object B to be observed, and the lock-in amplifier 32 that receives the signal from the light detection device 31 and that outputs the second harmonic or both the second harmonic and the third harmonic included in the temporal waveform of the signal. Similarly, the harmonic detection step S3 may include step S31 of generating a signal according to the light intensity of the fluorescence Lb generated in the object B to be observed, and step S32 of outputting the second harmonic or both the second harmonic and the third harmonic included in the temporal waveform of the signal. Accordingly, the second harmonic or both the second harmonic and the third harmonic can be detected easily and accurately.

As in the present embodiment, the harmonic detector 30 may detect the second harmonic and the third harmonic included in the temporal waveform of the light intensity of the fluorescence Lb generated in the object B to be observed. Similarly, in the harmonic detection step S3, the second harmonic and the third harmonic included in the temporal waveform of the light intensity of the fluorescence Lb generated in the object B to be observed may be detected. In the image generation step S6, an observation image of the object B to be observed may be generated based on one or both of the second harmonic and the third harmonic. In this case, an observation image can be easily generated using one of the second harmonic and the third harmonic, which is suitable for the object B to be observed.

First Modification Example

Figure 10:
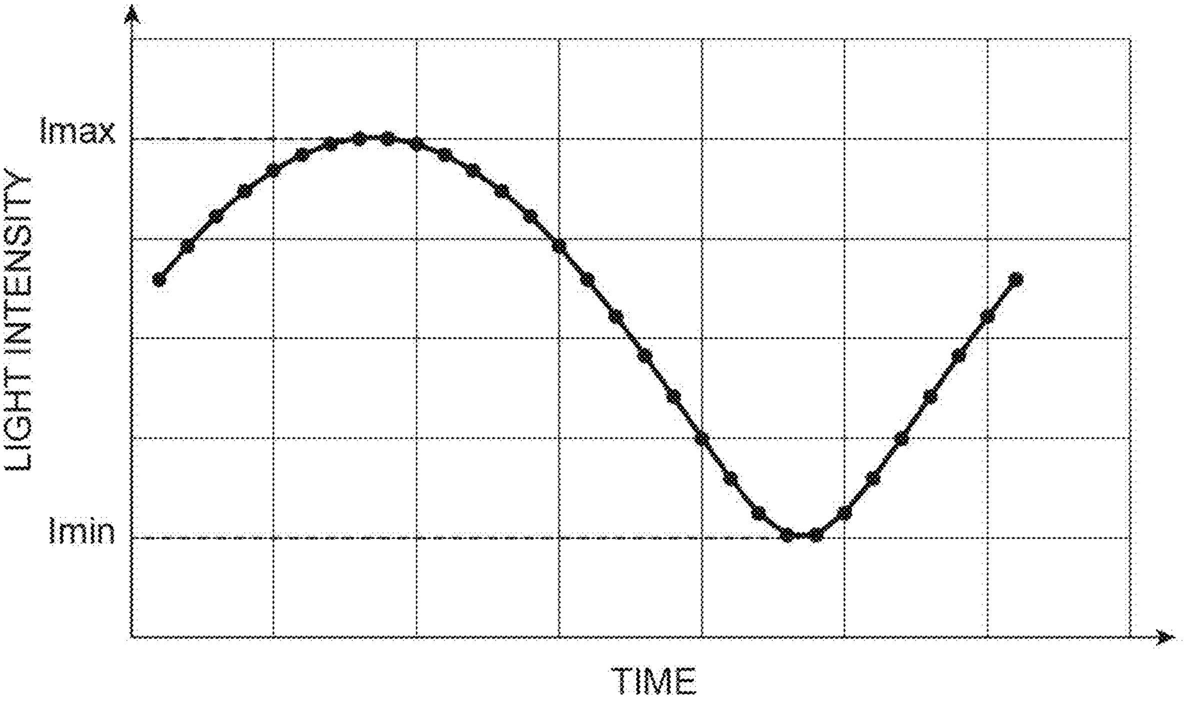
FIG. 10 is a diagram conceptually showing the temporal waveform of the excitation beam.

The temporal waveform of the excitation beam La shown in Formula (1), namely, the temporal waveform including the square root of a linear function of a sine wave is not limited to the example shown in Formula (2) and FIG. 2. For example, in the example shown in FIG. 2, the minimum value Imin in each period of the temporal waveform of the excitation beam La, namely, the envelope K is 0; however, the minimum value Imin in each period may be larger than 0. In other words, in Formula (1), the constant b may be larger than a. Alternatively, the minimum value Imin in each period of the temporal waveform of the excitation beam La may be larger than 0.1% or 5% and smaller than 20% of a maximum signal that can be received by the harmonic detector 30, specifically, the lock-in amplifier 32. FIG. 10 is a diagram conceptually showing the temporal waveform of the excitation beam La. In the present modification example as well, the maximum value Imax of the light intensity of the excitation beam La in each period is set to a size larger than the saturation excitation intensity of the object B to be observed.

Formula (3) is a formula that shows one example of the temporal waveform of the excitation beam La in the present modification example. Here, a is a real number larger than 0 and smaller than 1.

[Formula 3]

$$I_r = \sqrt{\alpha\left(\frac{\sin t + 1}{2}\right) + (1 - \alpha)} \tag{3}$$

The temporal waveform of the excitation beam La shown in Formula (3) periodically repeats between light intensity (1−α) and light intensity 1. Namely, the maximum value Imax in each period of the temporal waveform of the excitation beam La is 1, and the minimum value Imin is (1−α).

At the minimum value Imin in each period of the temporal waveform of the light intensity of the excitation beam La and in the vicinity thereof, the intensity of the generated fluorescence Lb is low, and the detection result thereof is greatly affected by noise. As in the present modification example, by setting the minimum value Imin in each period of the temporal waveform of the light intensity of the excitation beam La to be larger than 0, the influence of noise is reduced, so that the detection accuracy of the second harmonic and the third harmonic can be increased and an observation Image can be made clearer. Alternatively, the minimum value Imin in each period of the temporal waveform of the light intensity of the excitation beam La may be larger than 0.1% and smaller than 20% of a maximum signal that can be received by the harmonic detector 30 or in the harmonic detection step S3. Accordingly, the influence of noise can be reduced, so that the detection accuracy of the second harmonic and the third harmonic can be increased and an observation image can be made clearer.

Figure 11:
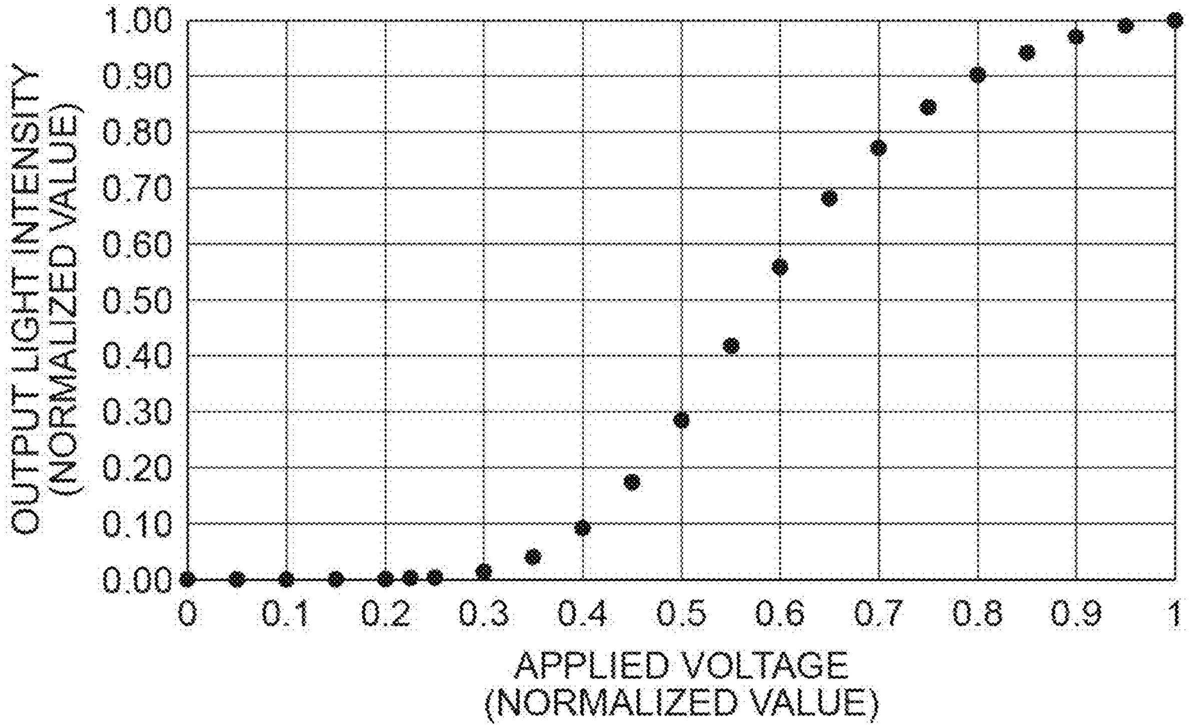
FIG. 11 is a graph conceptually showing a relationship between an applied voltage and an output light intensity of a general AO modulator.

When the temporal waveform of the light intensity of the excitation beam La includes the square root of a linear function of a sine wave, the rate of change in light intensity in the vicinity of the minimum value Imin in each period increases compared to when the temporal waveform of the excitation beam intensity is a sine wave. In other words, the temporal waveform of the light intensity in the vicinity of the minimum value Imin in each period becomes steep. When the minimum value Imin in each period is 0, the rate of change is at its largest (refer to FIG. 2). Here, FIG. 11 is a graph showing a typical example of a relationship between an applied voltage and an output light intensity of a general AO modulator. As shown in FIG. 11, the output light intensity from the AO modulator changes nonlinearly with respect to the input applied voltage. A change in output light intensity in a region where the applied voltage is low is extremely gentle. For this reason, when the rate of change in light intensity is large in a duration for which the light intensity of the excitation beam La is low, it is necessary to rapidly change the applied voltage to the AO modulator, so that the control of the applied voltage becomes difficult. In order to solve such a problem, as in the present modification example, by setting the minimum value Imin in each period to be larger than 0, the rate of change in light intensity in the vicinity of the minimum value Imin in each period is reduced, so that the steepness of the temporal waveform can be reduced. Alternatively, by setting the minimum value Imin in each period to be larger than 0.1% and smaller than 20% of the maximum signal that can be received by the harmonic detector 30 or in the harmonic detection step S3, the rate of change in light intensity in the vicinity of the minimum value Imin in each period is reduced, so that the steepness of the temporal waveform can be reduced. Therefore, in the excitation beam output unit 10 including an AO modulator as the light modulator 12, shaping the temporal waveform of the light intensity of the excitation beam La, particularly, shaping the temporal waveform in the vicinity of the minimum value Imin in each period becomes easy.

When the minimum value Imin in each period is set to be larger than 0 as described above, the minimum value in each period of the temporal waveform of the light intensity of the fluorescence Lb also becomes larger than 0. Therefore, when the temporal waveform of the light intensity of the fluorescence Lb is used as it is in the lock-in amplifier 32, the detection accuracy of the second harmonic and the third harmonic decreases, which is a risk. In order to avoid such a risk, the temporal waveform may be adjusted in the lock-in amplifier 32 or at the front stage of the lock-in amplifier 32 such that the minimum value in each period of the temporal waveform of the light intensity of the fluorescence Lb becomes zero. In other words, a variation in the temporal waveform of the fluorescence Lb due to a difference between the minimum value Imin of the excitation beam La and zero may be canceled.

Second Embodiment

Figure 12:
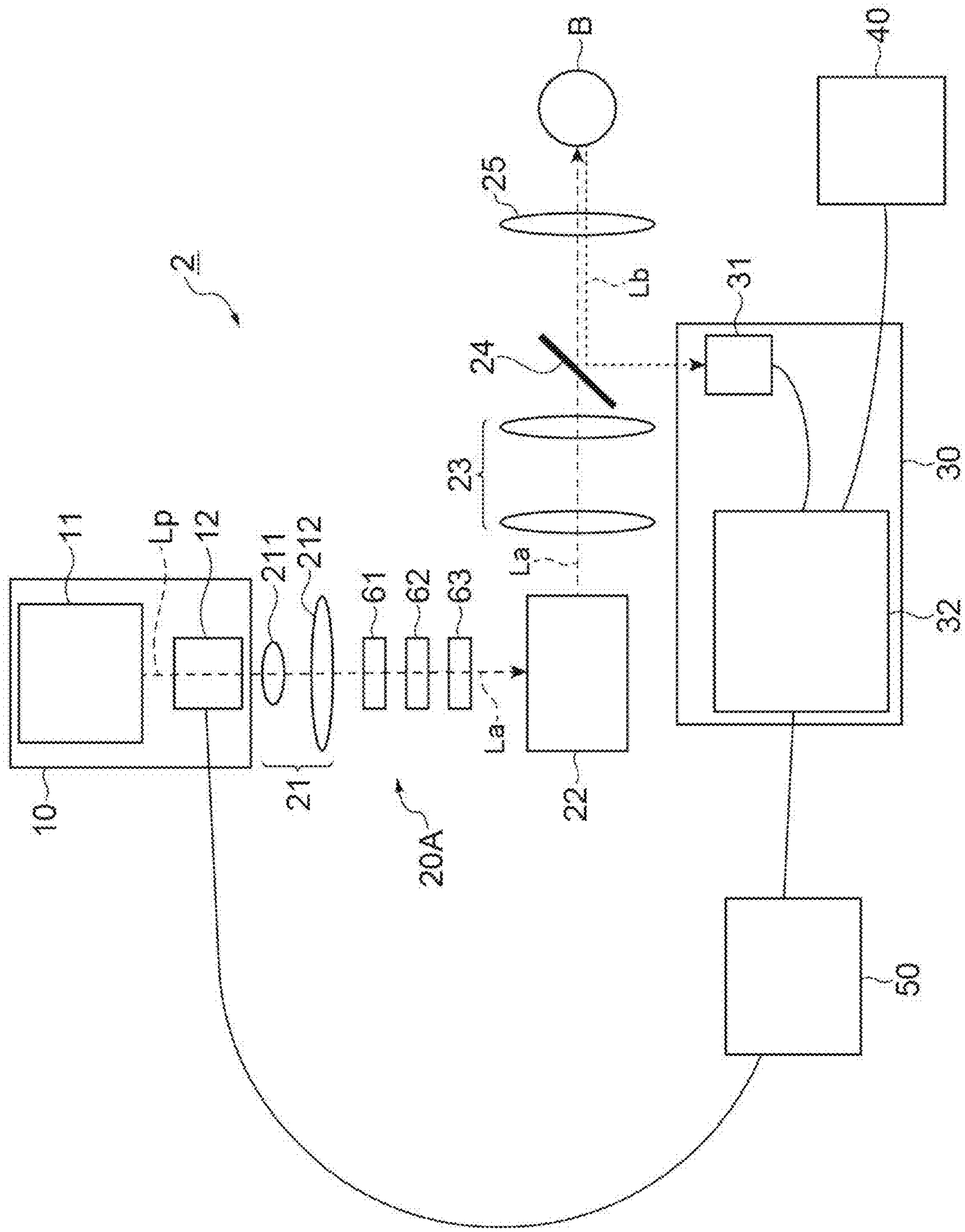
FIG. 12 is a diagram schematically showing a configuration of a light irradiation device according to a second embodiment.

FIG. 12 is a diagram showing a configuration of a microscope device 2 according to a second embodiment. The microscope device 2 is a device that acquires an image of the object B to be observed. The microscope device 2 includes the excitation beam output unit (excitation beam output device) 10, an optical system20A, the harmonic detector 30, the image generator 40, and the signal generator 50. The configurations of the excitation beam output unit 10, the harmonic detector 30, the image generator 40, and the signal generator 50 are the same as in the first embodiment.

The optical system 20A is an optical system that irradiates the object B to be observed with the excitation beam La output from the excitation beam output unit 10. The optical system 20A includes an optical path of the excitation beam La that reaches the object B to be observed from the excitation beam output unit 10. The optical system 20A includes the beam expander 21, a polarization converter 61, a phase converter 62, a ring mask 63, the optical scanner 22, the relay lens system 23, the dichroic mirror 24, and the objective lens 25. The configurations of the beam expander 21, the optical scanner 22, the relay lens system 23, the dichroic mirror 24, and the objective lens 25 are the same as in the first embodiment. In the shown example, the polarization converter 61, the phase converter 62, and the ring mask 63 are provided on an optical path between the beam expander 21 and the optical scanner 22. In the present embodiment as well, the irradiation position of the excitation beam La on the object B to be observed may be scanned by moving a stage, on which the object B to be observed is placed, in a plane perpendicular to the optical axis of the excitation beam La. In that case, the optical scanner 22 may not be provided. When the optical scanner 22 is provided, the polarization converter 61, the phase converter 62, and the ring mask 63 may be provided at the front stage of the optical scanner 22.

Figure 13:
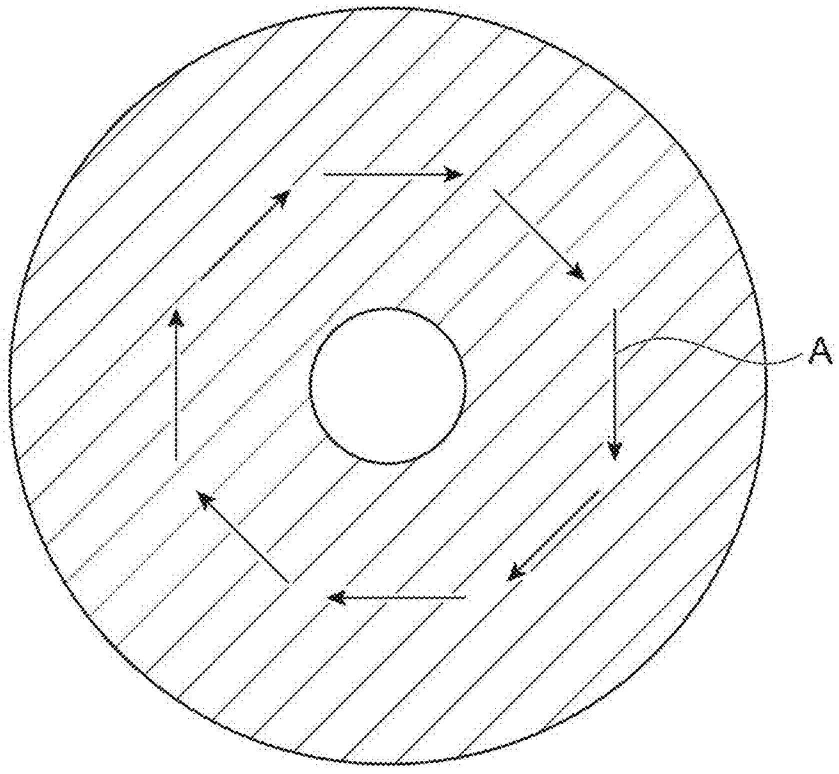
FIG. 13 is a diagram showing a polarization direction of azimuthally polarized beam in a plane perpendicular to an optical axis.
Figure 14:
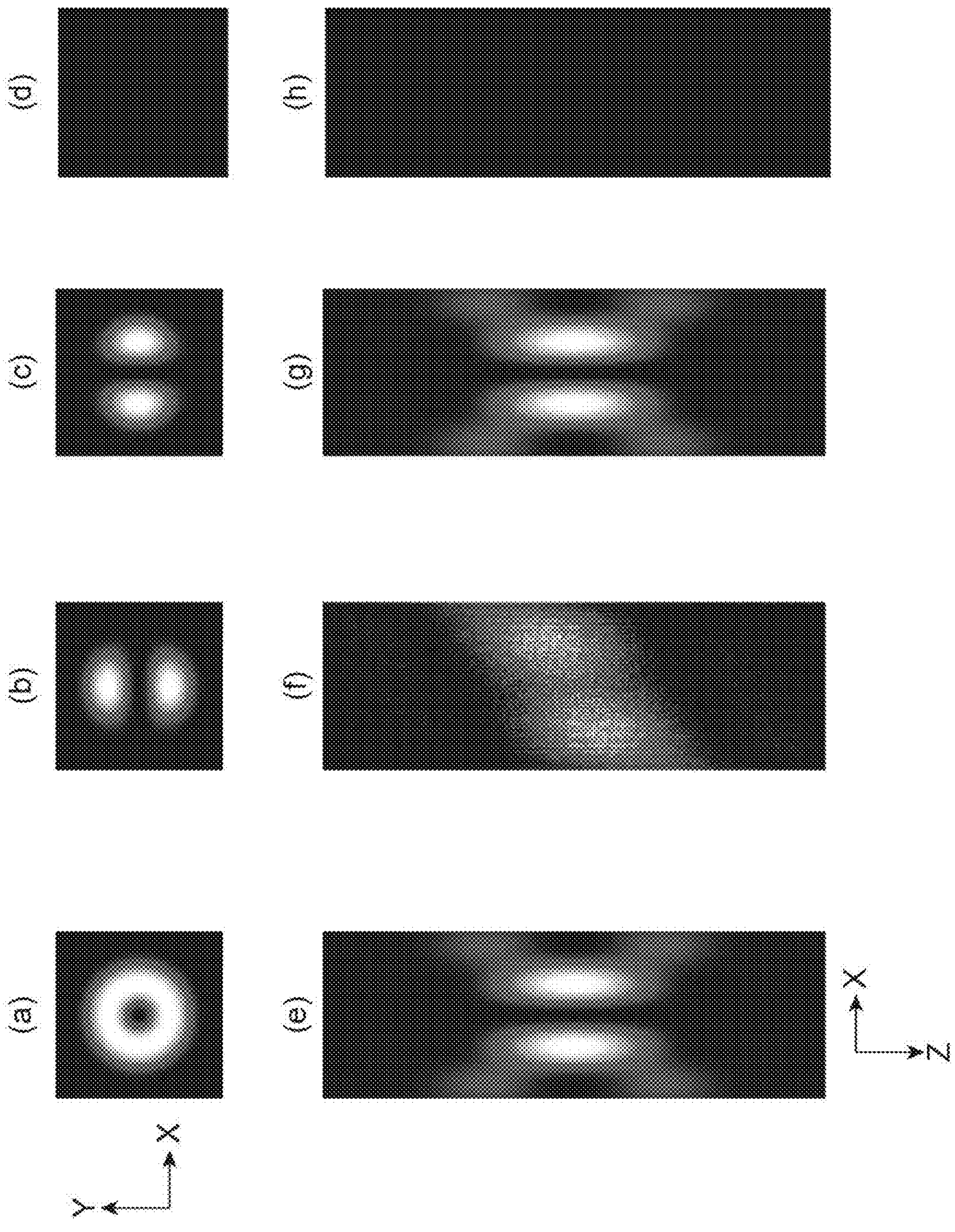
FIG. 14 includes (a) to (h) being figures showing focused images of the azimuthally polarized beam.

The polarization converter 61 is optically coupled to the excitation beam output unit 10 via the beam expander 21. The polarization converter 61 receives the excitation beam La, converts the excitation beam La into azimuthally polarized beam, and outputs the azimuthally polarized beam. The polarization state of the excitation beam La before being input to the polarization converter 61 is, for example, linear polarization. FIG. 13 is a diagram showing a polarization direction of azimuthally polarized beam in a plane perpendicular to the optical axis. In FIG. 13, arrow A indicates the polarization direction. FIG. 14 is a figure showing focused images of the azimuthally polarized beam. In FIG. 14, the light intensity is shown by color gradation; the darker a portion is, the lower the light intensity is, and the lighter a portion is, the higher the light intensity is. FIGS. 14(*a*) to 14(*d*) show light intensity distributions in planes perpendicular to the optical axis, and FIGS. 14(*e*) to 14(*h*) show light intensity distributions in planes including the optical axis and parallel to the optical axis. The XY coordinate system shown in the figure is applied to FIGS. 14(*a*) to 14(*d*). The ZX coordinate system shown in the figure is applied to FIGS. 14(*e*) to 14(*h*). FIGS. 14(*b*) and 14(*f*) show a light intensity ($|Ex|^2$) due to a vibration component Ex of an electric field in an X direction, namely, a direction perpendicular to the optical axis. FIGS. 14(*c*) and 14(*g*) show a light intensity ($|Ey|^2$) due to a vibration component Ey of the electric field in a Y direction, namely, a direction perpendicular to the optical axis and the X direction. FIGS. 14(*d*) and 14(*h*) show a light intensity ($|Ez|^2$) due to a vibration component Ez of the electric field in a Z direction, namely, the optical axis direction. FIGS. 14(*a*) and 14(*e*) show a light intensity ($|Ex|^2+|Ey|^2+|Ez|^2$) obtained by combining the vibration components of the electric field in all directions. As shown in FIGS. 13 and 14, in the azimuthally polarized beam, vibration directions of the electric field are along tangential directions of a circumference centered on the optical axis, and the light intensity decreases in the vicinity of the optical axis. Therefore, the light intensity distribution of the azimuthally polarized beam in a plane perpendicular to the optical axis has an annular shape. The polarization converter 61 converts the excitation beam La, which is input from the excitation beam output unit 10, into such azimuthally polarized beam, and outputs the azimuthally polarized beam. The polarization converter 61 can be formed of, for example, an azimuth polarizer or two spatial light modulators. The azimuth polarizer may be of a fixed type obtained by processing a glass plate, or a variable type using liquid crystal.

Figure 15:
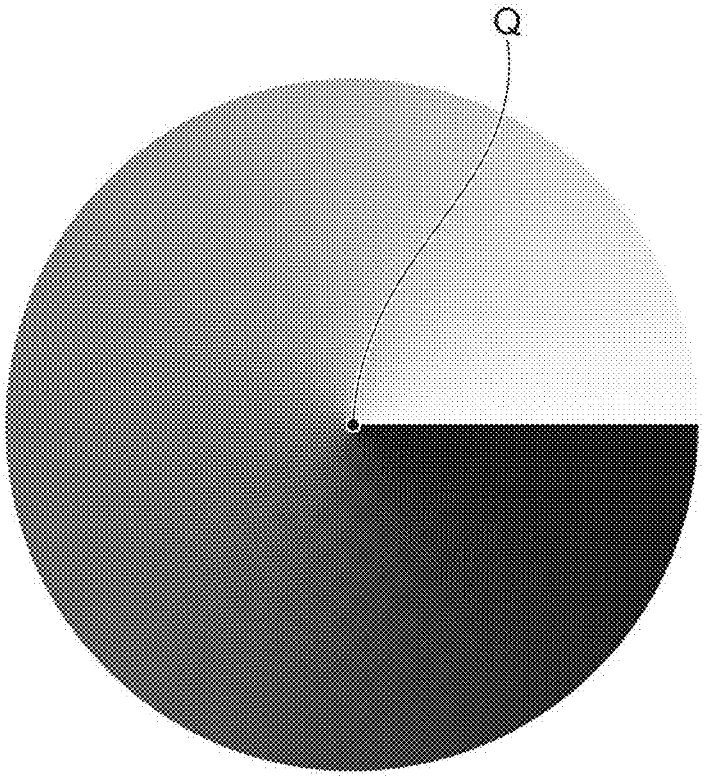
FIG. 15 is a diagram showing a spiral phase pattern.

The phase converter 62 is optically coupled to the excitation beam output unit 10 via the beam expander 21 and the polarization converter 61. The phase converter 62 receives the excitation beam La, and applies a phase modulation using a spiral phase pattern to the excitation beam La. FIG. 15 is a diagram showing a spiral phase pattern. In FIG. 15, the magnitude of the phase is shown by color gradation; the lighter a portion is, the smaller the phase is, and the darker a portion is, the larger the phase is. As shown in FIG. 15, in the spiral phase pattern, the phase changes monotonically according to the angle around an optical axis Q. In one example, in the spiral phase pattern, the phase changes from 0 (rad) to $2\pi$ (rad). Namely, a width of a phase change in one round is $2\pi$ (rad). The phase converter 62 can be formed of, for example, a spiral phase plate or a phase modulation type spatial light modulator. The phase plate may be, for example, a glass plate processed for phase modulation.

Figure 16:
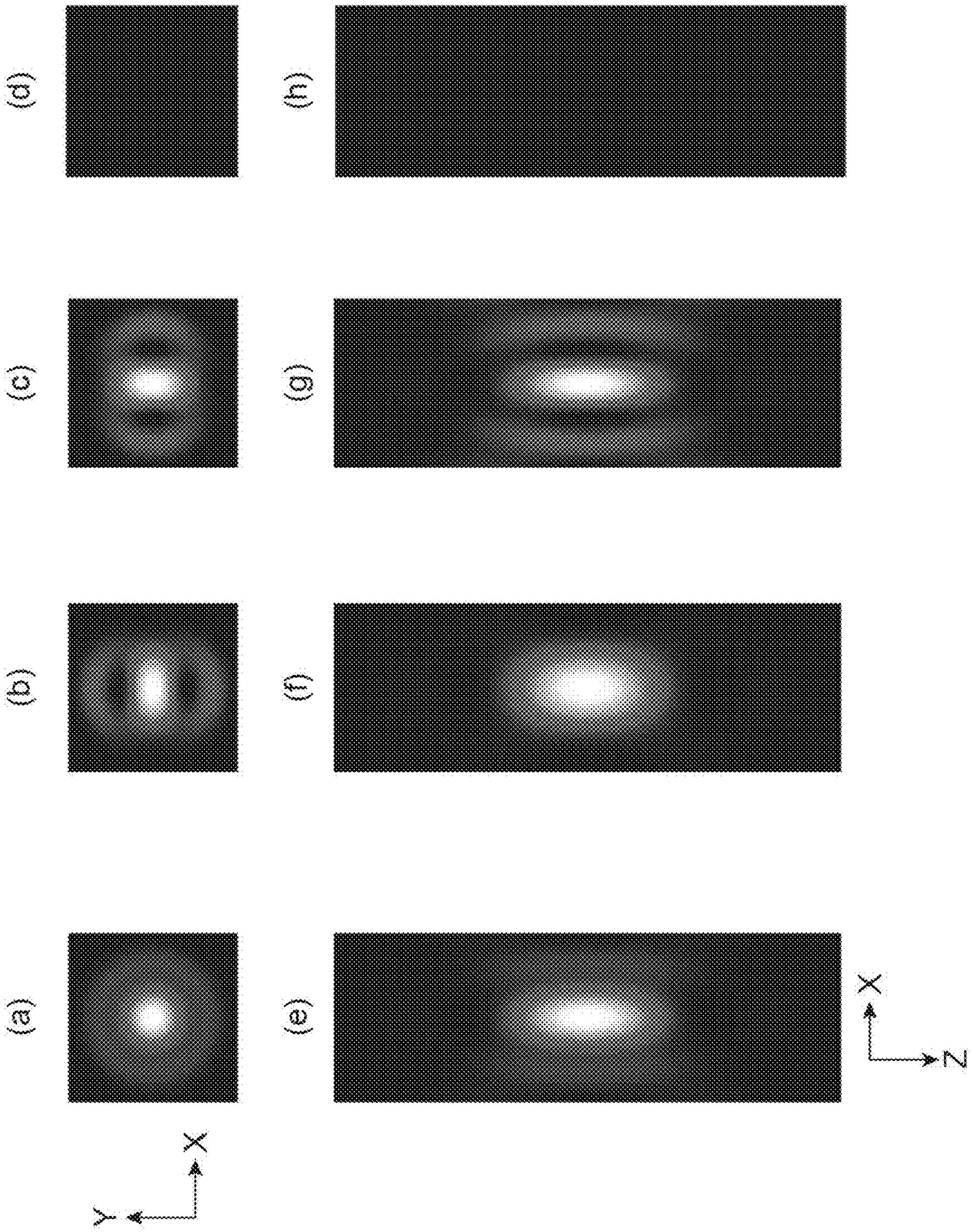
FIG. 16 includes (a) to (h) being figures showing focused images when a phase modulation using the spiral phase pattern is applied to the azimuthally polarized beam.

FIG. 16 is a figure showing focused images of a beam to which a phase modulation using a spiral phase pattern and azimuthal polarization are applied. In FIG. 16, the light intensity is shown by color gradation; the darker a portion is, the lower the light intensity is, and the lighter a portion is, the higher the light intensity is. FIGS. 16(*a*) to 16(*d*) show light intensity distributions in planes perpendicular to the optical axis, and FIGS. 16(*e*) to 16(*h*) show light intensity distributions in planes including the optical axis and parallel to the optical axis. The XY coordinate system shown in the figure is applied to FIGS. 16(*a*) to 16(*d*). The ZX coordinate system shown in the figure is applied to FIGS. 16(*e*) to 16(*h*). FIGS. 16(*b*) and 16(*f*) show the light intensity ($|Ex|^2$)

due to the vibration component Ex of the electric field in the X direction, namely, the direction perpendicular to the optical axis. FIGS. 16(*c*) and 16(*g*) show the light intensity ($|Ey|^2$) due to the vibration component Ey of the electric field in the Y direction, namely, the direction perpendicular to the optical axis and the X direction. FIGS. 164(*d*) and 16(*h*) show the light intensity ($|Ez|^2$) due to the vibration component Ez of the electric field in the Z direction, namely, the optical axis direction. FIGS. 16(*a*) and 16(*e*) show the light intensity ($|Ex|^2+|Ey|^2+|Ez|^2$) obtained by combining the vibration components of the electric field in all directions. As shown in FIG. 16, when a spiral phase pattern is combined with azimuthally polarized beam, the light intensity in the vicinity of the optical axis increases, and the light intensity distribution in a plane perpendicular to the optical axis changes from an annular shape to a solid circular shape. The excitation beam La has such a solid circular light intensity distribution by passing through the polarization converter 61 and the phase converter 62.

The ring mask 63 is optically coupled to the excitation beam output unit 10 via the beam expander 21, the polarization converter 61, and the phase converter 62. The ring mask 63 receives the excitation beam La, spatially modulates the intensity of the excitation beam La in a beam cross section of the excitation beam La, and outputs the modulated excitation beam La. The ring mask 63 includes a light-shielding portion having a ring shape and transmitting portions provided in contact with the inside and the outside of the light-shielding portion. The ring mask 63 of the present embodiment is a so-called multiple ring mask. The ring mask 63 can be formed of, for example, a plate-shaped member in which a light-shielding portion and a transmitting portion are formed, or a phase modulation type spatial light modulator. The plate-shaped member can be configured, for example, by forming a light-shielding film as the light-shielding portion on a light-transmitting plate material. Examples of the ring mask include an amplitude modulation type (in other words, an intensity modulation type), a phase modulation type, and a composite type thereof. The ring mask 63 of the present embodiment is of an amplitude modulation type.

Figure 17:
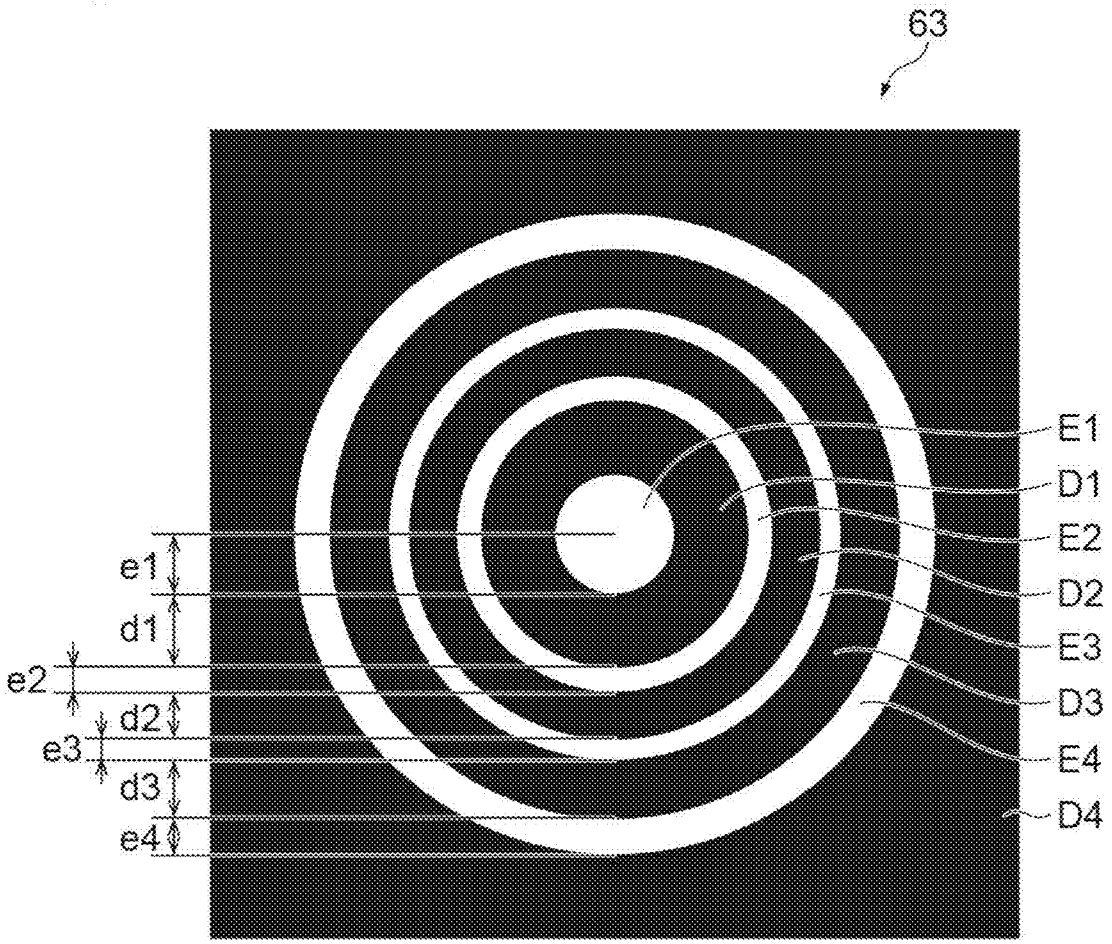
FIG. 17 is a diagram showing one example of a configuration of a ring mask when viewed in an optical axis direction.

FIG. 17 is a diagram showing one example of a configuration of the ring mask 63 when viewed in the optical axis direction. The ring mask 63 includes a plurality of light-shielding portions having a ring shape and provided around a center position. In the shown example, the ring mask 63 includes three light-shielding portions D1, D2, and D3. Furthermore, the ring mask 63 includes a transmitting portion E1, a transmitting portion E2, a transmitting portion E3, a transmitting portion E4, and a light-shielding portion D4. The transmitting portion E1 is a transmitting portion located in an innermost layer and provided inside the light-shielding portion D1. The transmitting portion E2 is a transmitting portion having a ring shape and provided between the light-shielding portion D1 and the light-shielding portion D2. The transmitting portion E3 is a transmitting portion having a ring shape and provided between the light-shielding portion D2 and the light-shielding portion D3. The transmitting portion E4 is a transmitting portion having a ring shape, located in an outermost layer, and provided outside the light-shielding portion D3. The light-shielding portion D4 is provided outside the transmitting portion E4.

A light transmittance of the transmitting portions E1 to E4 is larger than a light transmittance of the light-shielding portions D1 to D4. The light transmittance of the transmitting portions E1 to E4 may be 1 or may be smaller than 1. The light transmittance of the light-shielding portions D1 to D4 may be 0 or may be larger than 0. The boundaries between the transmitting portions and the light-shielding portions adjacent to each other among the transmitting portion E1, the light-shielding portion D1, the transmitting portion E2, the light-shielding portion D2, the transmitting portion E3, the light-shielding portion D3, the transmitting portion E4, and the light-shielding portion D4 may be concentric circles or may be ellipses. The following description will be given based on the assumption that the boundaries are circles. A radial width, namely, radius of the transmitting portion E1 is denoted by e1. A radial width of the light-shielding portion D1 is denoted by d1. A radial width of the transmitting portion E2 is denoted by e2. A radial width of the light-shielding portion D2 is denoted by d2. A radial width of the transmitting portion E3 is denoted by e3. A radial width of the light-shielding portion D3 is denoted by d3. A radial width of the transmitting portion E4 is denoted by e4.

The radial width of each of two adjacent light-shielding portions among the light-shielding portions D1, D2, and D3 having a ring shape is larger than the radial width of the transmitting portion provided between the two light-shielding portions. Namely, in the ring mask 63 of the present embodiment, the respective radial widths of the light-shielding portions D1 and D2 and the transmitting portion E2 have a relationship represented by the following formula (4), and the respective radial widths of the light-shielding portions D2 and D3 and the transmitting portion E3 have a relationship represented by the following formula (5). All combinations of two adjacent light-shielding portions having a ring shape may have such a relationship.

[Formula 4]

$$\begin{cases} e2 < d1 \\ e2 < d2 \end{cases} \tag{4}$$

[Formula 5]

$$\begin{cases} e3 < d2 \\ e3 < d3 \end{cases} \tag{5}$$

In the present embodiment, the arrangement order of the polarization converter 61, the phase converter 62, and the ring mask 63 is not limited to the example shown in FIG. 12, and can be changed in various modes. Namely, the polarization converter 61, the phase converter 62, and the ring mask 63 may be arranged in an order shown in any of FIGS. 18(*a*) to 18(*e*) when viewed from the excitation beam output unit 10.

Figure 18:
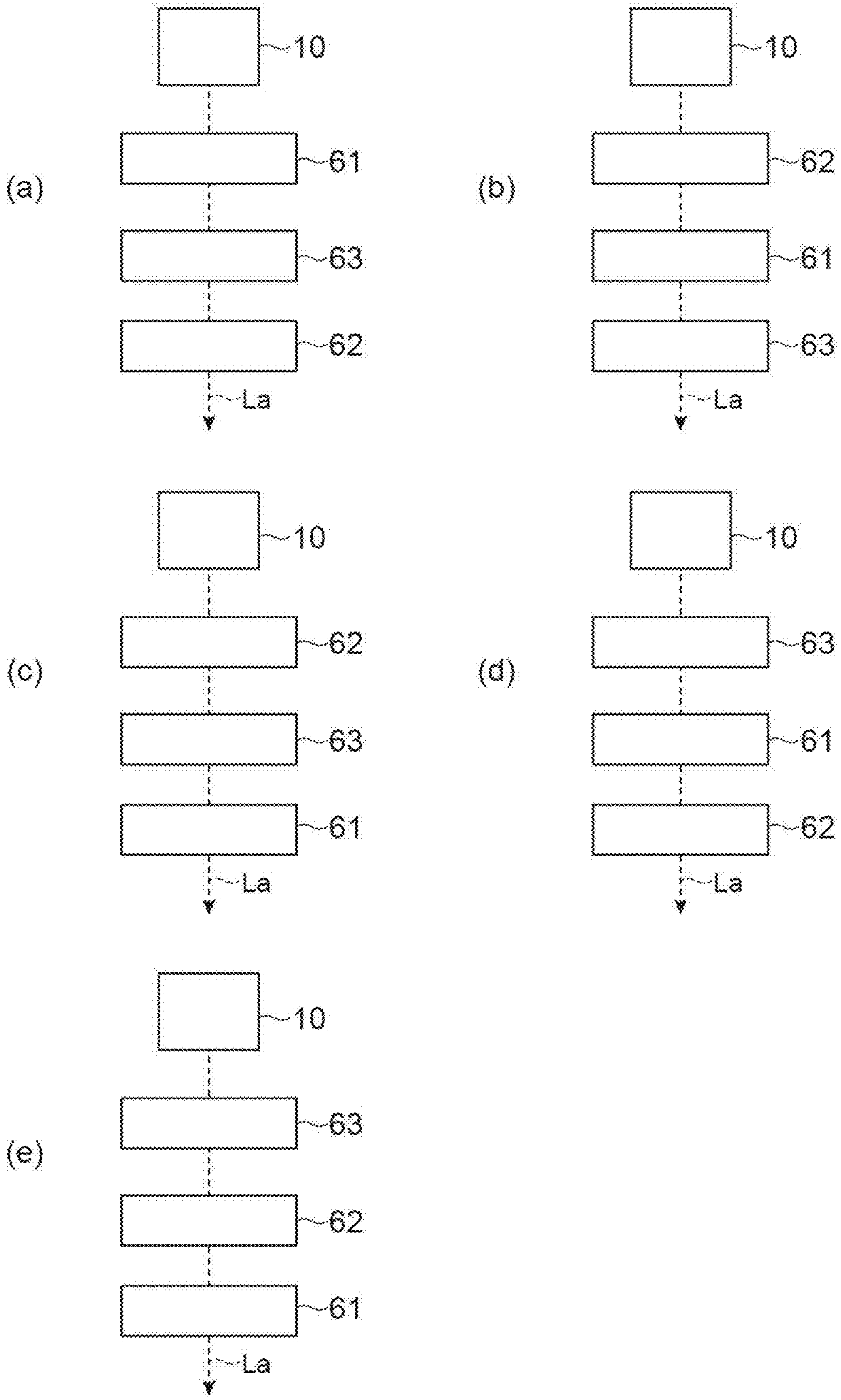
FIG. 18 includes (a) to (e) being diagrams showing examples of the arrangement order of a polarization converter, a phase converter, and the ring mask.

FIG. 18(*a*): The polarization converter 61, the ring mask 63, and the phase converter 62 are arranged in order when viewed from the excitation beam output unit 10.

FIG. 18(*b*): The phase converter 62, the polarization converter 61, and the ring mask 63 are arranged in order when viewed from the excitation beam output unit 10.

FIG. 18(*c*): The phase converter 62, the ring mask 63, and the polarization converter 61 are arranged in order when viewed from the excitation beam output unit 10.

FIG. 18(*d*): The ring mask 63, the polarization converter 61, and the phase converter 62 are arranged in order when viewed from the excitation beam output unit 10.

FIG. 18(*e*): The ring mask 63, the phase converter 62, the polarization converter 61 are arranged in order when viewed from the excitation beam output unit 10.

Referring again to FIG. 12, in the present embodiment, the optical scanner 22 is optically coupled to the beam expander 21 via the polarization converter 61, the phase converter 62, and the ring mask 63.

In the present embodiment, the objective lens 25 is, for example, a dry objective lens, a water immersion objective lens, an oil immersion objective lens, or a silicone immersion objective lens. An objective lens used to observe a transparent sample may be used as the objective lens 25. When the objective lens 25 is a water immersion objective lens, a numerical aperture thereof is, for example, 1.2 or more. When the objective lens 25 is an oil immersion objective lens, a numerical aperture thereof is, for example, 1.45 or more. A ratio (NA/R) between a refractive index R of a medium between the objective lens 25 and the object B to be observed and a numerical aperture NA of the objective lens 25 is, for example, 0.75 or more.

Figure 19:
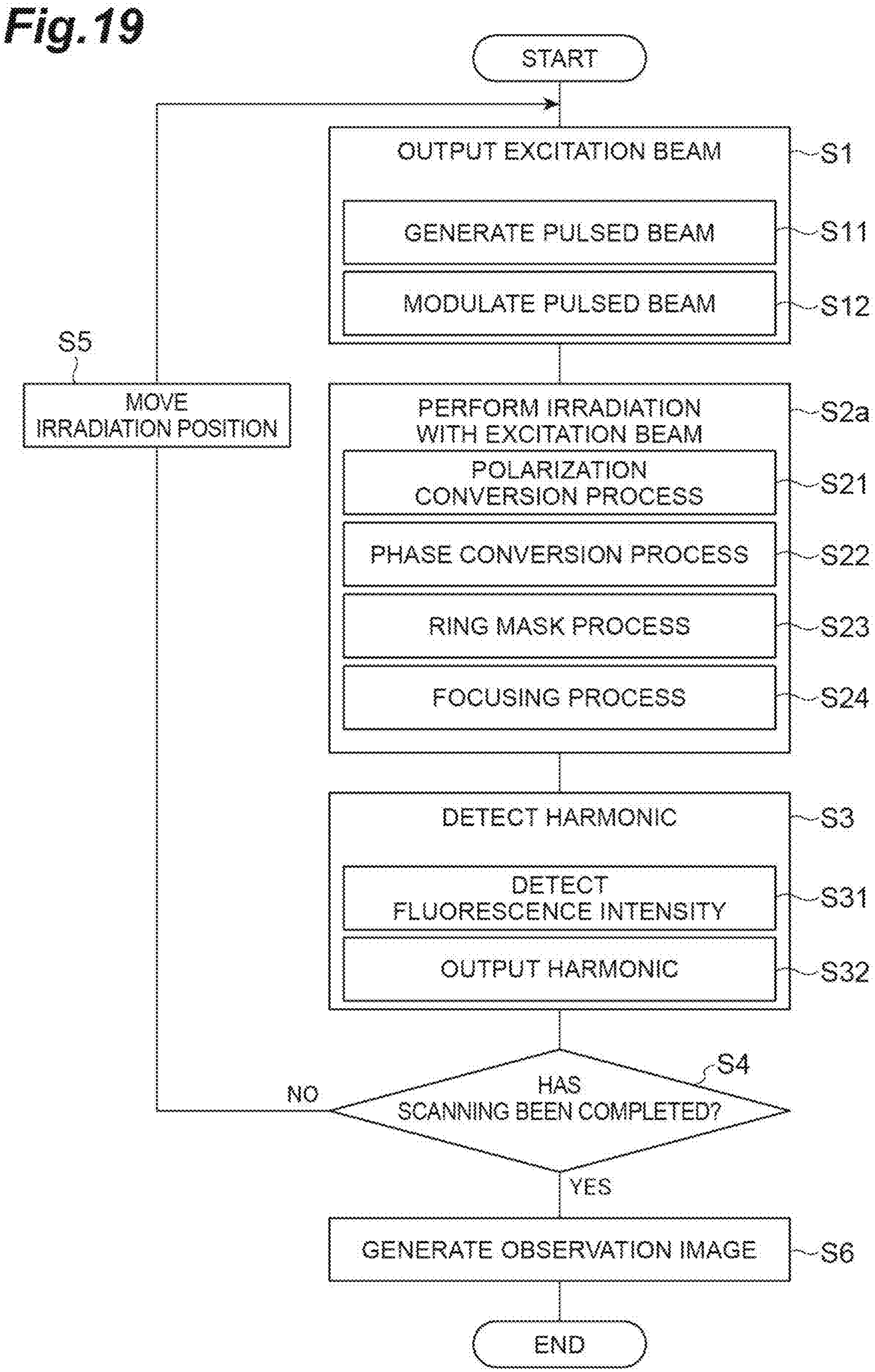
FIG. 19 is a flowchart for describing operation of the microscope device.

FIG. 19 is a flowchart for describing operation of the microscope device 2 according to the present embodiment. An image acquisition method according to the present embodiment will be described with reference to FIG. 19, together with the operation of the microscope device 2.

First, the excitation beam output step S1 is performed. Details of the excitation beam output step S1 are the same as in the first embodiment.

Next, an excitation beam irradiation step S2*a* is performed. In the excitation beam irradiation step S2*a*, the object B to be observed is irradiated with the excitation beam La output in the excitation beam output step S1, via the beam expander 21, the polarization converter 61, the phase converter 62, the ring mask 63, the optical scanner 22, the relay lens system 23, the dichroic mirror 24, and the objective lens 25. Namely, in the excitation beam irradiation step S2*a*, a polarization conversion process S21 by the polarization converter 61, a phase conversion process S22 by the phase converter 62, and a ring mask process S23 by the ring mask 63 are performed on the excitation beam La output in the excitation beam output step S1. Further, in the excitation beam irradiation step S2*a*, a focusing process S24 of focusing the excitation beam La on the object B to be observed is performed using the objective lens 25. The polarization conversion process S21 is a process of converting the excitation beam La into azimuthally polarized beam. The phase conversion process S22 is a process of applying a phase modulation using a spiral phase pattern to the excitation beam La. In the focusing process S24 of the excitation beam irradiation step S2*a*, the excitation beam La may be focused using a water immersion objective lens having a numerical aperture of 1.2 or more. Alternatively, the excitation beam La may be focused using an oil immersion objective lens having a numerical aperture of 1.45 or more. Each of the phase conversion process S22 and the ring mask process S23 may be performed using a phase modulation type spatial light modulator.

Subsequently, the harmonic detection step S3 is performed. Details of the harmonic detection step S3 are the same as in the first embodiment.

The excitation beam output step S1, the excitation beam irradiation step S2*a*, and the harmonic detection step S3 are repeatedly performed while scanning the irradiation position of the excitation beam La on the object B to be observed using the optical scanner 22 (steps S4 and S5). Accordingly, data regarding the magnitude of the second harmonic or both the second harmonic and the third harmonic at a plurality of positions on the object B to be observed is obtained.

After the scanning by the optical scanner 22 is completed (step S4: YES), the image generation step S6 is performed. Details of the image generation step S6 are the same as in the first embodiment.

According to the microscope device 2 and the image acquisition method of the present embodiment described above, the same actions and effects as in the first embodiment can be obtained. In addition, according to the microscope device 2 and the image acquisition method of the present embodiment, actions and effects to be described below can also be obtained.

In a microscope device, a beam output from a light source passes through a condenser lens, and is focused on the surface or inside of an object to be observed, and the surface or inside is irradiated with the beam. When a beam is focused in such a manner, a beam waist diameter that is a measure of the size of a focusing diameter thereof can be reduced to only approximately half the wavelength of the beam. This is called a diffraction limit.

A ring mask is used to reduce the focusing diameter beyond the diffraction limit. Examples of the ring mask include a single ring mask and a multiple ring mask. The single ring mask includes a single light-shielding portion having a ring shape and transmitting portions provided inside and outside the light-shielding portion. Beams that have passed through the transmitting portions inside and outside the light-shielding portion pass through the condenser lens, and reach a focusing position. By causing the two beams to interfere with each other at the focusing position, the beams can be focused in a region smaller than the diffraction limit. The multiple ring mask includes a plurality of light-shielding portions having a ring shape and disposed concentrically, and a plurality of transmitting portions provided between the plurality of light-shielding portions. A beam that has passed through each transmitting portion passes through the condenser lens, and reaches the focusing position. Even when such a multiple ring mask is used, the beam can be focused in a smaller region beyond the diffraction limit.

Figure 20:
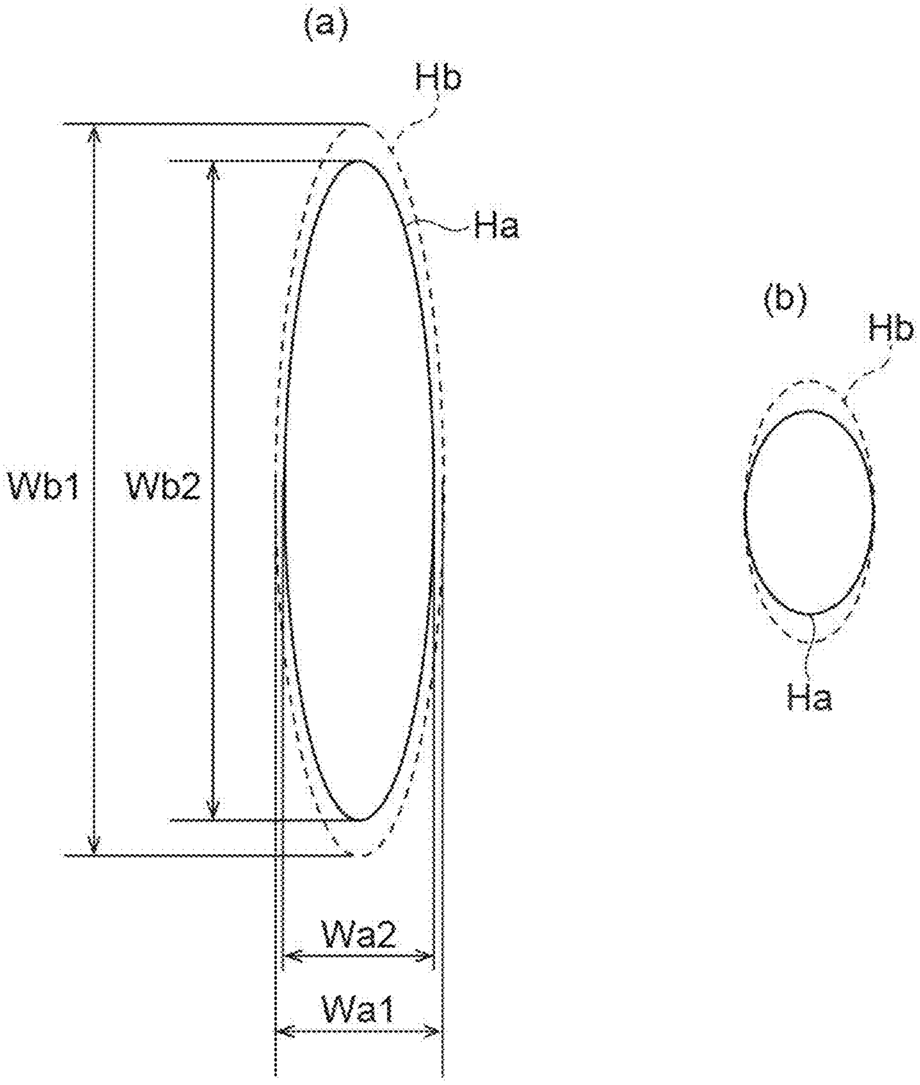
FIG. 20 includes (a) and (b) being diagrams showing focused spot shapes in cross sections including the optical axis and parallel to the optical axis.

FIGS. 20(*a*) and 20(*b*) are diagrams showing focused spot shapes in cross sections including the optical axis and parallel to the optical axis. In these diagrams, solid line Ha indicates focused spot shapes when the ring mask is provided, and broken line Hb indicates focused spot shapes when the ring mask is not provided. FIG. 20(*a*) assumes that a water immersion objective lens having a numerical aperture of 0.9 is used. FIG. 20(*b*) assumes that a water immersion objective lens having a numerical aperture of 1.3 is used. As shown in FIG. 20, the size of the focused spot can be reduced by providing the ring mask.

As a reference example, a case where a multiple ring mask is applied to circularly polarized beam is considered. Tables 1 and 2 below are tables showing one example of a relationship between the numerical aperture of the objective lens and the degree of reduction in focused spot diameter by providing the ring mask in a light irradiation device according to the reference example. A volume improvement rate shown in these tables is a value (A1/A2) obtained by dividing a volume A1 of a focused spot when the ring mask is not provided by a volume A2 of a focused spot when the ring mask is provided. A lateral improvement rate is a value (Wa1/Wa2) obtained by dividing a focused spot diameter in the direction perpendicular to the optical axis, namely, a diameter Wa1 shown in FIG. 20 when the ring mask is not provided by a focused spot diameter in the direction perpendicular to the optical axis, namely, a width Wa2 shown in FIG. 20 when the ring mask is provided. A longitudinal improvement rate is a value (Wb1/Wb2) obtained by dividing a focused spot length in the optical axis direction, namely, a length Wb1 shown in FIG. 20 when the ring mask is not provided by a focused spot length in the optical axis direction, namely, a length Wb2 shown in FIG. 20 when the ring mask is provided. The focused spot diameter and the focused spot length are full widths at half maximum (FWHM) of a light intensity distribution. In these examples, the ring mask was a multiple ring mask including a quadruple light-shielding portion, and a configuration of the ring mask that minimizes the volume of the focused spot under the condition that the light intensity of a side lobe is 2.5% or less of the light intensity of a main lobe, namely, the focused spot was searched. The configuration of the ring mask indicates, specifically, the widths d1 to d3 of the light-shielding portions D1 to D3 and the widths e1 to e4 of the transmitting portions E1 to E4. Table 1 assumes that the objective lens is a water immersion objective lens. Table 2 assumes that the objective lens is an oil immersion objective lens. Table 3 assumes that the objective lens is a dry objective lens.

TABLE 1

| Numerical aperture | 1.3 | 1.25 | 1.2 | 1.15 | 1.1 | 1.05 | 1.0 | 0.95 | 0.9 |
|---|---|---|---|---|---|---|---|---|---|
| Volume improvement rate (%) | 1.46 | 1.35 | 1.34 | 1.36 | 1.37 | 1.38 | 1.38 | 1.37 | 1.37 |
| Lateral improvement rate (%) | 1.02 | 1.06 | 1.07 | 1.08 | 1.08 | 1.08 | 1.10 | 1.09 | 1.09 |
| Longitudinal improvement rate (%) | 1.41 | 1.21 | 1.18 | 1.16 | 1.17 | 1.17 | 1.14 | 1.15 | 1.15 |

TABLE 2

| Numerical aperture | 1.5 | 1.49 | 1.45 | 1.42 | 1.40 | 1.35 | 1.3 | 1.25 | 1.20 | 1.15 | 1.10 | 1.05 |
|---|---|---|---|---|---|---|---|---|---|---|---|---|
| Volume improvement rate (%) | 1.30 | 1.31 | 1.32 | 1.32 | 1.33 | 1.32 | 1.34 | 1.39 | 1.41 | 1.42 | 1.42 | 1.42 |
| Lateral improvement rate (%) | 1.02 | 1.03 | 1.05 | 1.06 | 1.06 | 1.07 | 1.08 | 1.08 | 1.08 | 1.09 | 1.09 | 1.09 |
| Longitudinal improvement rate (%) | 1.24 | 1.24 | 1.19 | 1.18 | 1.18 | 1.15 | 1.16 | 1.20 | 1.20 | 1.19 | 1.19 | 1.19 |

TABLE 3

| Numerical aperture | 0.99 | 0.95 | 0.90 | 0.85 | 0.80 | 0.75 | 0.70 | 0.65 | 0.60 | 0.55 |
|---|---|---|---|---|---|---|---|---|---|---|
| Volume improvement rate (%) | 1.30 | 1.32 | 1.31 | 1.34 | 1.40 | 1.42 | 1.44 | 1.45 | 1.57 | 1.76 |
| Lateral improvement rate (%) | 1.02 | 1.05 | 1.07 | 1.08 | 1.08 | 1.09 | 1.10 | 1.10 | 1.12 | 1.12 |
| Longitudinal improvement rate (%) | 1.25 | 1.20 | 1.15 | 1.15 | 1.21 | 1.19 | 1.20 | 1.19 | 1.25 | 1.40 |

As shown in Tables 1 and 2, regardless of the type and numerical aperture of the objective lens, by providing the ring mask, all of the volume improvement rate, the lateral improvement rate, and the longitudinal improvement rate are made larger than 1. However, the lateral improvement rate is small compared to the longitudinal improvement rate. Particularly, in the case of using an objective lens having a large numerical aperture such as a water immersion objective lens having a numerical aperture of 1.05 or more, an oil immersion objective lens having a numerical aperture of 1.25 or more, or a dry objective lens having a numerical aperture of 0.8 or more, the lateral improvement rate is 1.08 or less, and such a tendency is remarkable. Here, it is assumed that a refractive index of a medium between the water immersion objective lens and the object B to be observed, namely, an immersion liquid is 1.333. It is assumed that a refractive index of a medium between the oil immersion objective lens and the object B to be observed, namely, an immersion liquid is 1.518. It is assumed that a refractive index of a medium between the dry objective lens and the object B to be observed, namely, air is 1. At this time, the ratio (NA/R) between the numerical aperture NA at which the lateral improvement rate starts to decrease to 1.08 or less and the refractive index R is 0.75 or more for all of the water immersion objective lens, the oil immersion objective lens, and the dry objective lens. When the lateral improvement rate is small, the degree of reduction in focused spot diameter is small, and for example, the degree of improvement in the resolution of the microscope is also small.

Regarding the above-described problems, the inventors have found that the degree of reduction in focusing diameter can be increased by providing the polarization converter 61 that converts the beam into azimuthally polarized beam and the phase converter 62 that applies a phase modulation using a spiral phase pattern, in addition to the ring mask 63. Similarly, the inventors have found that the degree of reduction in focusing diameter can be increased by performing the polarization conversion process S21 of converting the beam into azimuthally polarized beam and the phase conversion process S22 of applying a phase modulation using a spiral phase pattern.

Figure 21:
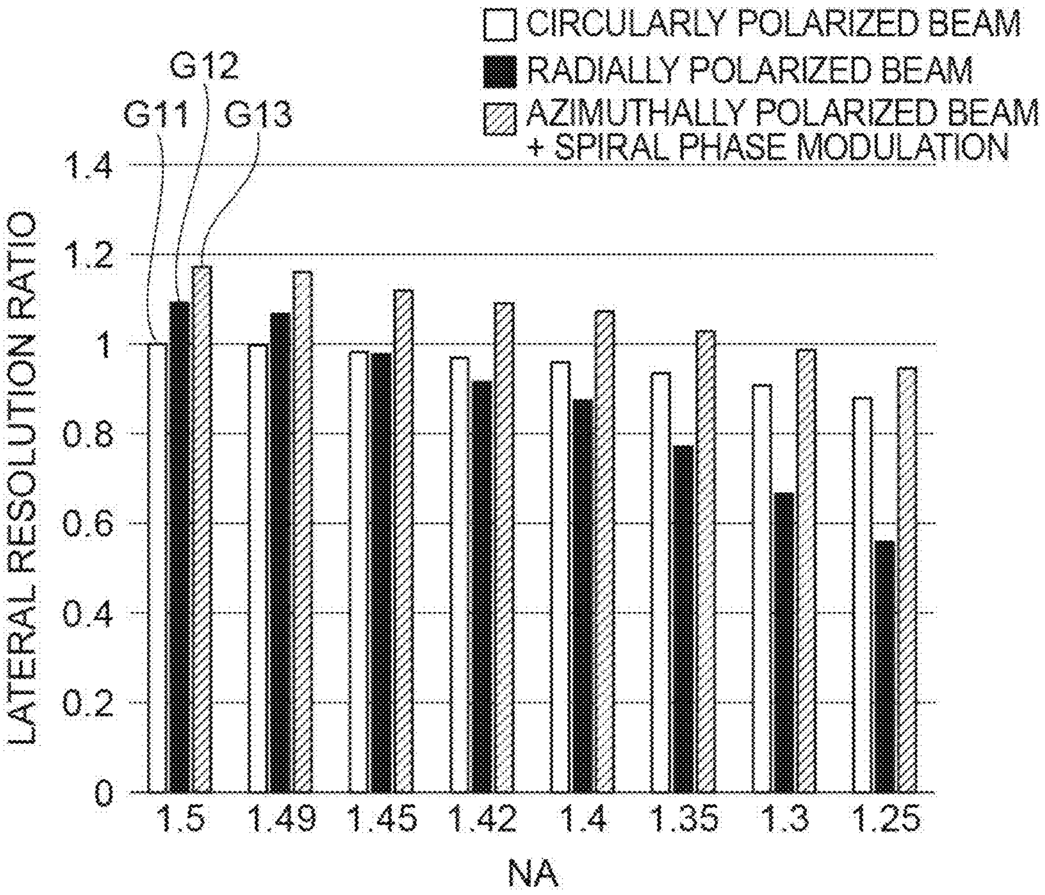
FIG. 21 is a graph showing a lateral resolution ratio for each aperture ratio when the ring mask is not used.

FIG. 21 is a graph showing a lateral resolution ratio for each aperture ratio when the ring mask is not used. In FIG. 21, a bar G11 indicates a case where a beam with which the object B to be observed is irradiated is circularly polarized beam. A bar G12 indicates a case where a beam with which the object B to be observed is irradiated is radially polarized beam. A bar G13 indicates a case where a beam with which the object B to be observed is irradiated is a combination of azimuthally polarized beam and a spiral phase modulation. The vertical axis represents the lateral resolution ratio. The lateral resolution ratio is a value obtained by dividing a lateral resolution when a numerical aperture of an oil immersion objective lens is 1.50 and a beam with which the object B to be observed is irradiated is circularly polarized beam by a lateral resolution for each numerical aperture and each polarized beam. The horizontal axis represents the numerical aperture. Referring to FIG. 21, it can be seen that even in the case of not using the ring mask, when a beam with which the object B to be observed is irradiated is a combination of azimuthally polarized beam and a spiral phase modulation, the lateral resolution ratio is improved at any numerical aperture compared to when a beam with the object B to be observed is irradiated is circularly polarized beam or radially polarized beam.

Figure 22:
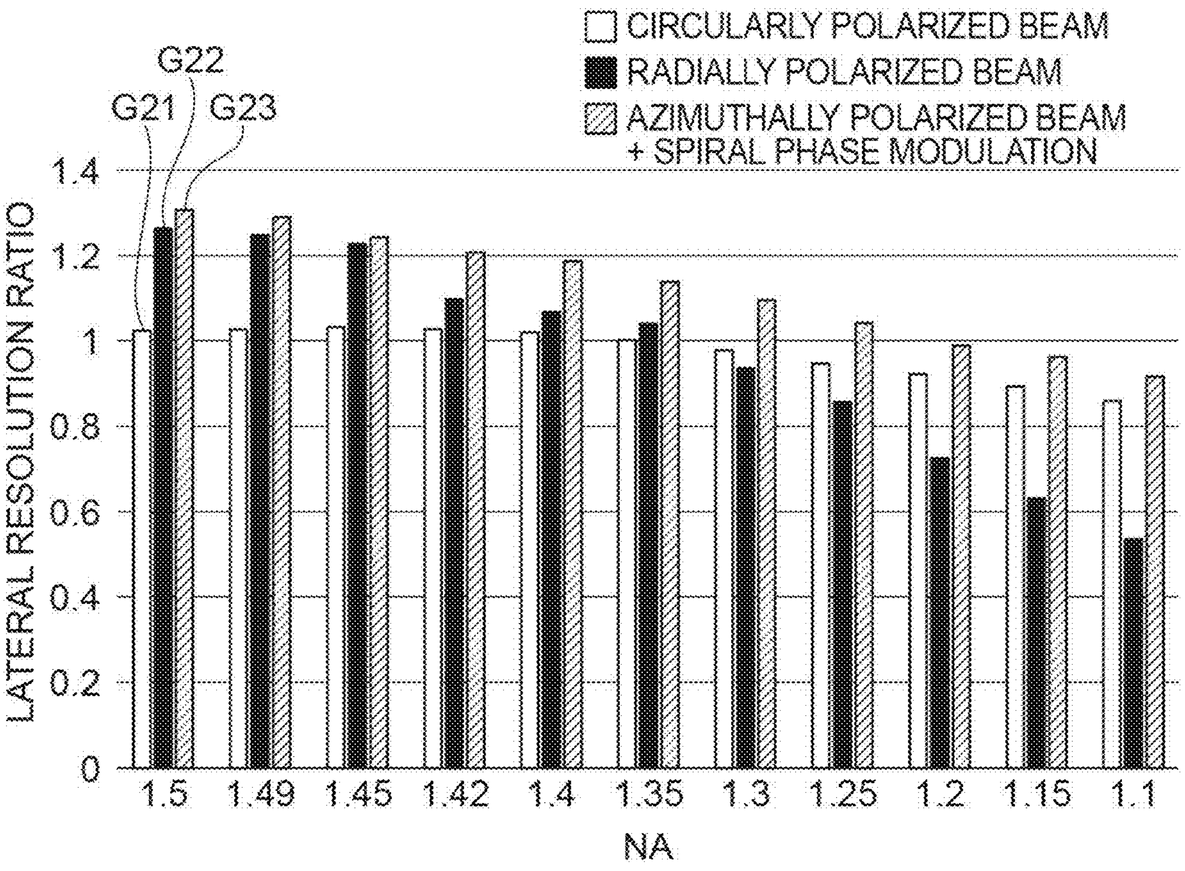
FIG. 22 is a graph showing a lateral resolution ratio for each aperture ratio when the ring mask is used.

FIG. 22 is a graph showing a lateral resolution ratio for each aperture ratio when the ring mask is used. In FIG. 22, a bar G21 indicates a case where a beam with which the object B to be observed is irradiated is circularly polarized beam. A bar G22 indicates a case where a beam with which the object B to be observed is irradiated is radially polarized beam. A bar G23 indicates a case where a beam with which the object B to be observed is irradiated is a combination of azimuthally polarized beam and a spiral phase modulation. The vertical axis represents the lateral resolution ratio. The lateral resolution ratio is a value obtained by dividing a lateral resolution when a numerical aperture of an oil immersion objective lens is 1.50 and a beam with which the object B to be observed is irradiated is circularly polarized beam in the case of not using the ring mask by a lateral resolution for each numerical aperture and each polarized beam in the case of using the ring mask. The horizontal axis represents the numerical aperture. Referring to FIG. 22, when the ring mask is used, even in a case where a beam with which the object B to be observed is irradiated is in any polarization state, the lateral resolution ratio is improved compared to when the ring mask is not used. Particularly, when a beam with which the object B to be observed is irradiated is a combination of azimuthally polarized beam and a spiral phase modulation, the lateral resolution ratio is significantly improved.

In such a manner, in addition to the ring mask, by irradiating the object B to be observed with the beam that is a combination of azimuthally polarized beam and a spiral phase modulation, the lateral resolution ratio, namely, the lateral improvement rate is significantly improved. Therefore, according to the present embodiment, the degree of reduction in focusing diameter can be increased.

Figure 23:
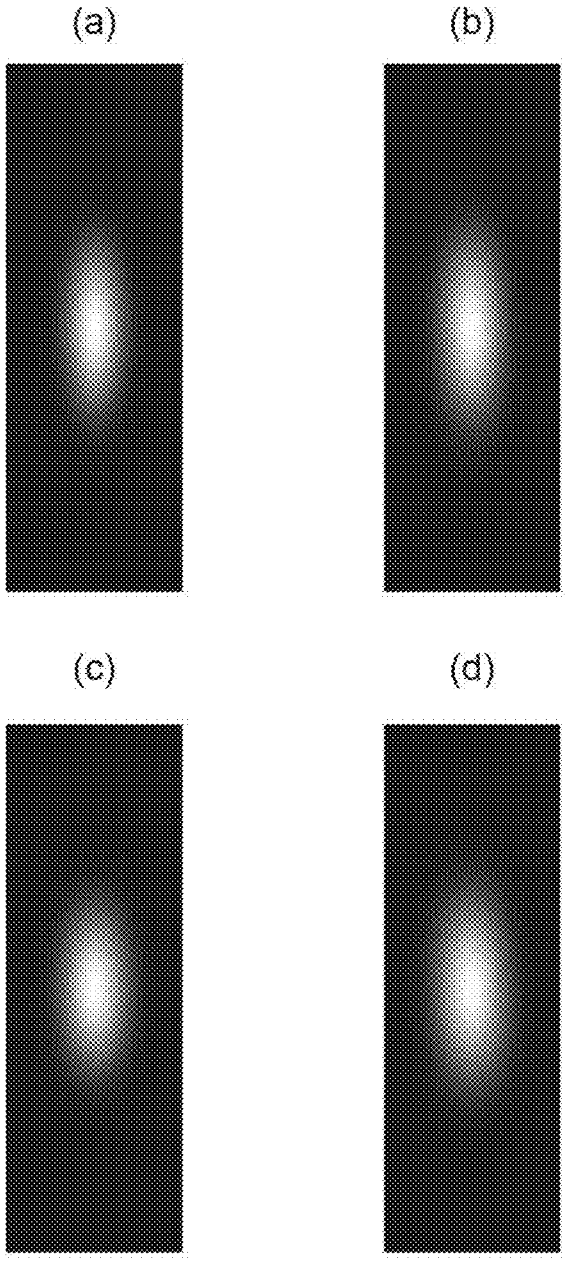
FIG. 23 includes (a) to (d) being figures showing fluorescence of which the second harmonic is detected in cross sections including the optical axis and parallel to the optical axis direction.
Figure 24:
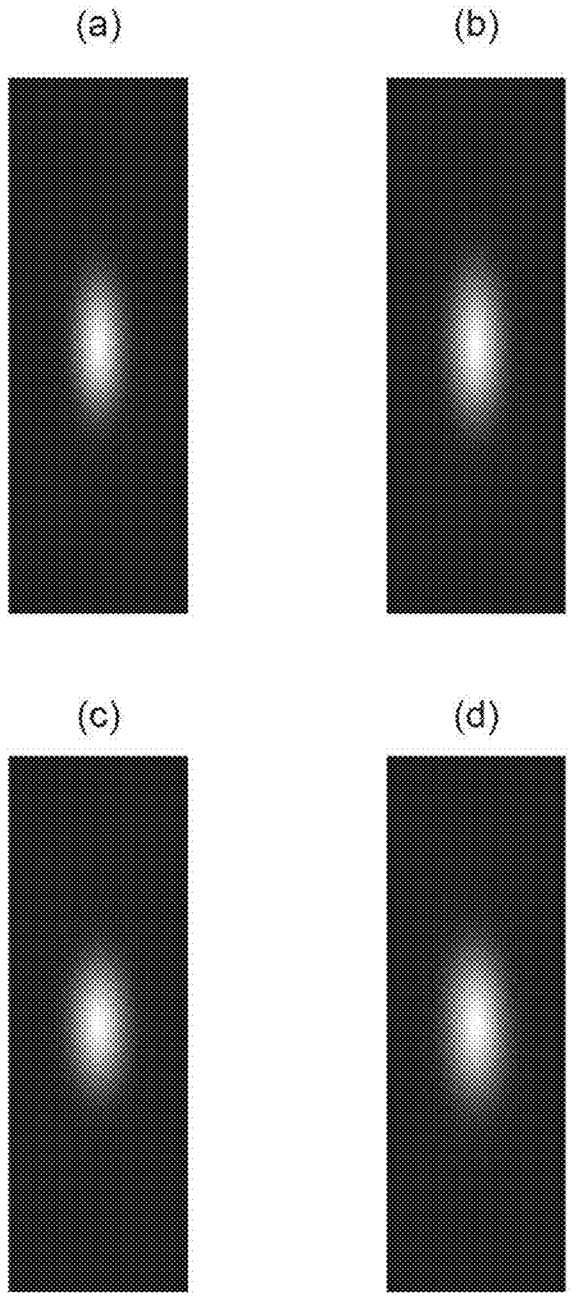
FIG. 24 includes (a) to (d) being figures showing fluorescence of which the third harmonic is detected in cross sections including the optical axis and parallel to the optical axis direction.

FIG. 23 is a figure showing fluorescence of which the second harmonic is detected in cross sections including the optical axis and parallel to the optical axis direction. FIG. 24 is a figure showing fluorescence of which the third harmonic is detected in the same cross sections. In these figures, the light intensity is shown by color gradation; the darker a portion is, the lower the light intensity is, and the lighter a portion is, the higher the light intensity is. FIGS. 23(*a*) and 23(*b*) and FIGS. 24(*a*) and 24(*b*) show fluorescence images when the excitation beam La with which the object B to be observed is irradiated is a beam obtained by applying a spiral phase modulation to azimuthally polarized beam, and FIGS. 23(*c*) and 23(*d*) and FIGS. 24(*d*) and 24(*d*) show fluorescence images when the excitation beam La with which the object B to be observed is irradiated is circularly polarized beam as a reference example. FIGS. 23(*a*) and 23(*c*) and FIGS. 24(*a*) and 24(*c*) show fluorescence images when the ring mask 63 is provided, and FIGS. 23(*b*) and 23(*d*) and FIGS. 24(*b*) and 24(*d*) show fluorescence images when the ring mask 63 is not provided.

When FIGS. 23(*a*) and 23(*c*) and FIGS. 24(*a*) and 24(*c*) are compared to FIGS. 23(*b*) and 23(*d*) and FIGS. 24(*b*) and 24(*d*), it can be seen that when the ring mask 63 is provided, the dimensions of the fluorescence images in a lateral direction and a longitudinal direction are reduced compared to when the ring mask 63 is not provided. When FIGS. 23(*a*) and 23(*b*) and FIGS. 24(*a*) and 24(*b*) are compared to FIGS. 23(*c*) and 23(*d*) and FIGS. 24(*c*) and 24(*d*), it can be seen that when the excitation beam La with which the object B to be observed is irradiated is a beam obtained by applying a spiral phase modulation to azimuthally polarized beam, particularly, the dimensions of the fluorescence images in the lateral direction are reduced compared to when the excitation beam La with which the object B to be observed is irradiated is circularly polarized beam.

As described above, the ring mask 63 and the ring mask process S23 may be of an amplitude modulation type. Examples of the ring mask include an amplitude modulation type, a phase modulation type, and a composite type thereof. Since a light use efficiency of the phase modulation type is higher than a light use efficiency of the amplitude modulation type, according to the phase modulation type, the irradiation with the beam can be efficiently performed while reducing loss. However, when the phase modulation type ring mask is used, side lobes that are unnecessary focused portions are likely to occur on both sides of the focused spot in the optical axis direction. For example, Non Patent Literature 3 discloses that a main lobe is made smaller by causing a side lobe to interfere with the main lobe. For example, in a single-photon excitation fluorescence microscope or the like, since a confocal optical system can be used to increase the resolution through the confocal effect caused by a pinhole, the occurrence of such unnecessary focused portions is allowed to some extent. However, for example, in a two-photon excitation fluorescence microscope or the like, the excitation efficiency is lower than that of the single-photon excitation type, and during observation of a deep portion, a large deviation occurs between the pinhole position and the focusing position due to the influence of an aberration, so that the optical loss is large. By using an amplitude modulation type ring mask, side lobes that are unnecessary focused portions are reduced compared to when a phase modulation type ring mask is used. Accordingly, the need to provide a confocal optical system including a pinhole is eliminated, which can contribute to downsizing of the device while suppressing optical loss.

The ratio (NA/R) between the refractive index R of the medium between the objective lens 25 and the object B to be observed and the numerical aperture NA of the objective lens 25 may be 0.75 or more. Similarly, in the focusing process S24 of the excitation beam irradiation step S2, the excitation beam La may be focused using the objective lens 25 in which the ratio (NA/R) between the refractive index R of the medium between the objective lens 25 and the object B to be observed and the numerical aperture NA of the objective lens 25 is 0.75 or more. According to the microscope device 2 and the image acquisition method of the present embodiment, when the numerical aperture of the objective lens is large in such a manner, the degree of reduction in focusing diameter can be further increased. As the objective lens, a water immersion objective lens, an oil immersion objective lens, a dry objective lens, a silicone immersion objective lens, an objective lens compatible with a clear solution, or the like can be used.

As described above, each of the phase converter 62 and the ring mask 63 may be formed of a phase modulation type spatial light modulator. Similarly, each of the phase conversion process S22 and the ring mask process S23 may be performed using a phase modulation type spatial light modulator. In this case, a change in phase pattern in the phase converter 62 or the phase conversion process S22 can be easily performed. Further, a change in the widths d1 to d3 of the light-shielding portions D1 to D3 and the widths e1 to e4 of the transmitting portions E1 to E4 in the ring mask 63 and the ring mask process S23 can be easily performed.

As described above, the ring mask 63 may include the plurality of light-shielding portions D1 to D3 having a ring shape and provided around the center position; the transmitting portions E2 and E3, each being provided between two adjacent light-shielding portions among the plurality of light-shielding portions D1 to D3; the transmitting portion E1 located in the innermost layer and provided inside the light-shielding portion D1 located in an innermost layer among the plurality of light-shielding portions D1 to D3; and the transmitting portion E4 located in the outermost layer and provided outside the light-shielding portion D3 located in an outermost layer among the plurality of light-shielding portions D1 to D3. The degree of reduction in focusing diameter can be further increased by using such a multiple ring mask.

Second Modification Example

Figure 25:
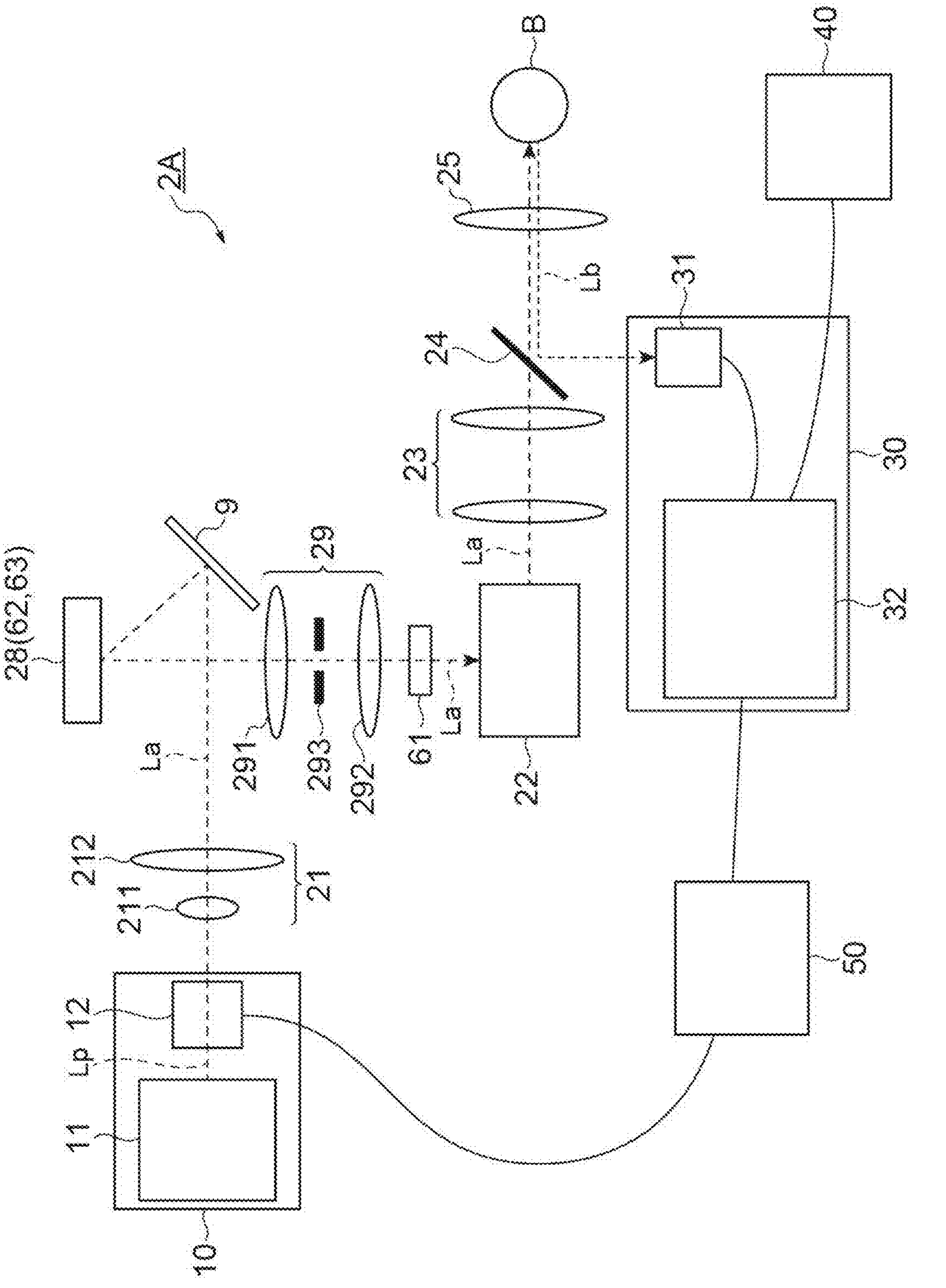
FIG. 25 is a diagram schematically showing a configuration of a light irradiation device according to a second modification example.

FIG. 25 is a diagram schematically showing a configuration of a microscope device 2A according to one modification example of the second embodiment. The microscope device 2A differs from the microscope device 2 of the second embodiment in that the microscope device 2A includes a phase modulation type spatial light modulator 28 and an aperture optical system 29 instead of the phase converter 62 and the ring mask 63 of the microscope device 2 described above. The other configurations of the microscope device 2A are the same as those of the microscope device 2 of the second embodiment. Depending on the relative disposition of the excitation beam output unit 10 and the spatial light modulator 28, the excitation beam output unit 10 and the spatial light modulator 28 may be optically coupled to each other by, for example, an optical system such as a mirror 9.

Figure 26:
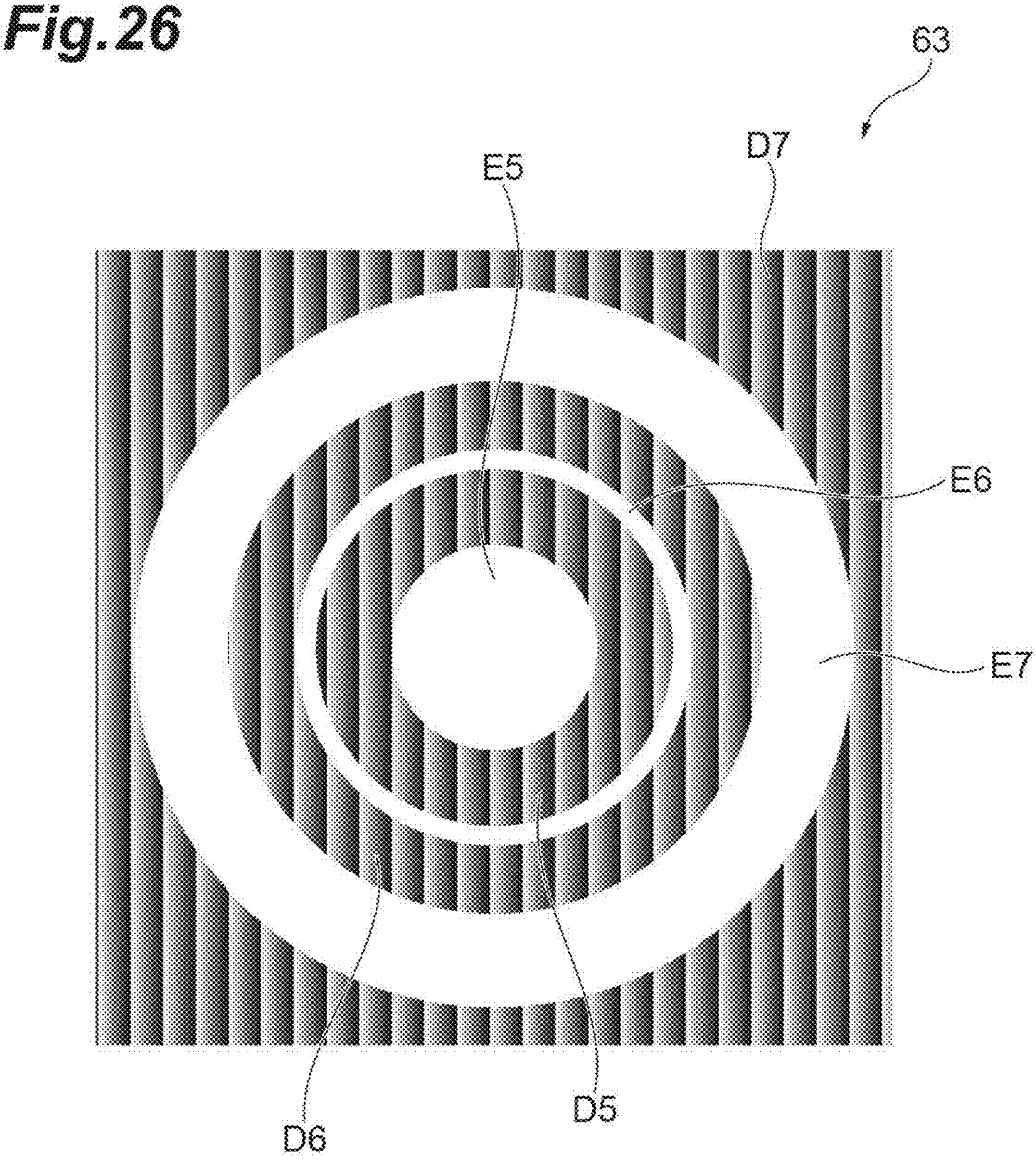
FIG. 26 is a diagram showing an example of a phase pattern forming an amplitude modulation type ring mask.

The spatial light modulator 28 has both the function of the phase converter 62 and the function of the ring mask 63. In other words, in the present modification example, a spatial light modulator forming the phase converter 62 is common with a spatial light modulator forming the ring mask 63. The spatial light modulator 28 presents a phase pattern in which a phase pattern forming the phase converter 62 and a phase pattern forming the ring mask 63 are superimposed. A phase pattern for correcting an aberration may be further superimposed on the phase pattern. Particularly, since an aberration that the spatial light modulator 28 itself affects the accuracy of the spiral phase modulation, the aberration is corrected. An aberration that occurs during observation of a deep portion, for example, a spherical aberration that occurs due to a difference in refractive index between the object B to be observed and the immersion liquid, and the like may be corrected at the same time by the spatial light modulator 28. The spatial light modulator 28 forms the amplitude modulation type ring mask 63 using a phase pattern. FIG. 26 is a diagram showing an example of the phase pattern forming the amplitude modulation type ring mask 63. In FIG. 26, the phase value of each pixel forming the phase pattern is shown by color gradation; the lighter the color is, the smaller the phase value is, and the darker the color is, the larger the phase value is. In this example, the ring mask 63 is a triple ring mask. Namely, the ring mask 63 includes a plurality of light-shielding portions having a ring shape and provided around the center position. In the shown example, the ring mask 63 includes two light-shielding portions D5 and D6. Furthermore, the ring mask 63 includes a transmitting portion E5 located in an innermost layer and provided inside the light-shielding portion D5; a transmitting portion E6 having a ring shape and provided between the light-shielding portion D5 and the light-shielding portion D6; a transmitting portion E7 having a ring shape, located in an outermost layer, and provided outside the light-shielding portion D6; and a light-shielding portion D7 provided outside the transmitting portion E7.

The light-shielding portions D5 to D7 are formed of a grating of which the phase value changes periodically, and the phase values of the transmitting portions E5 to E7 are constant. Specifically, in the light-shielding portions D5 to D7, a phase distribution that monotonically increases from 0 (rad) to 2π (rad) in each period is periodically repeated. Due to such a phase pattern, an emission direction of the beam emitted from the light-shielding portions D5 to D7 is inclined with respect to an emission direction of the beam emitted from the transmitting portions E5 to E7.

Referring again to FIG. 25, the aperture optical system 29 is provided at the rear stage of the spatial light modulator 28, and is optically coupled to the spatial light modulator 28. The aperture optical system 29 includes a pair of lenses 291 and 292 and an aperture 293 disposed between the lenses 291 and 292. The beam emitted from the spatial light modulator 28 forms a beam waist between the lens 291 and the lens 292. The aperture 293 is located at the beam waist, and shields at least a part of the beam emitted from the light-shielding portions D5 to D7 of the spatial light modulator 28. Accordingly, the light emitted from the light-shielding portions D5 to D7 of the spatial light modulator 28 is attenuated or excluded, and the beam emitted from the transmitting portions E5 to E7 passes through the aperture 293. In the present modification example as well, a light transmittance of the transmitting portions is larger than a light transmittance of the light-shielding portions. The light transmittance of the transmitting portions is defined as the ratio of a light intensity of the light, which is emitted from the transmitting portions E5 to E7 to pass through the aperture 293, to a light intensity of the beam incident on the transmitting portions E5 to E7. The light transmittance of the light-shielding portions is defined as the ratio of a light intensity of the beam, which is emitted from the light-shielding portions D5 to D7 to pass through the aperture 293, to a light intensity of the beam incident on the light-shielding portions D5 to D7. The light transmittance of the transmitting portions may be 1 or may be smaller than 1. The light transmittance of the light-shielding portions may be 0 or may be larger than 0.

Figure 27:
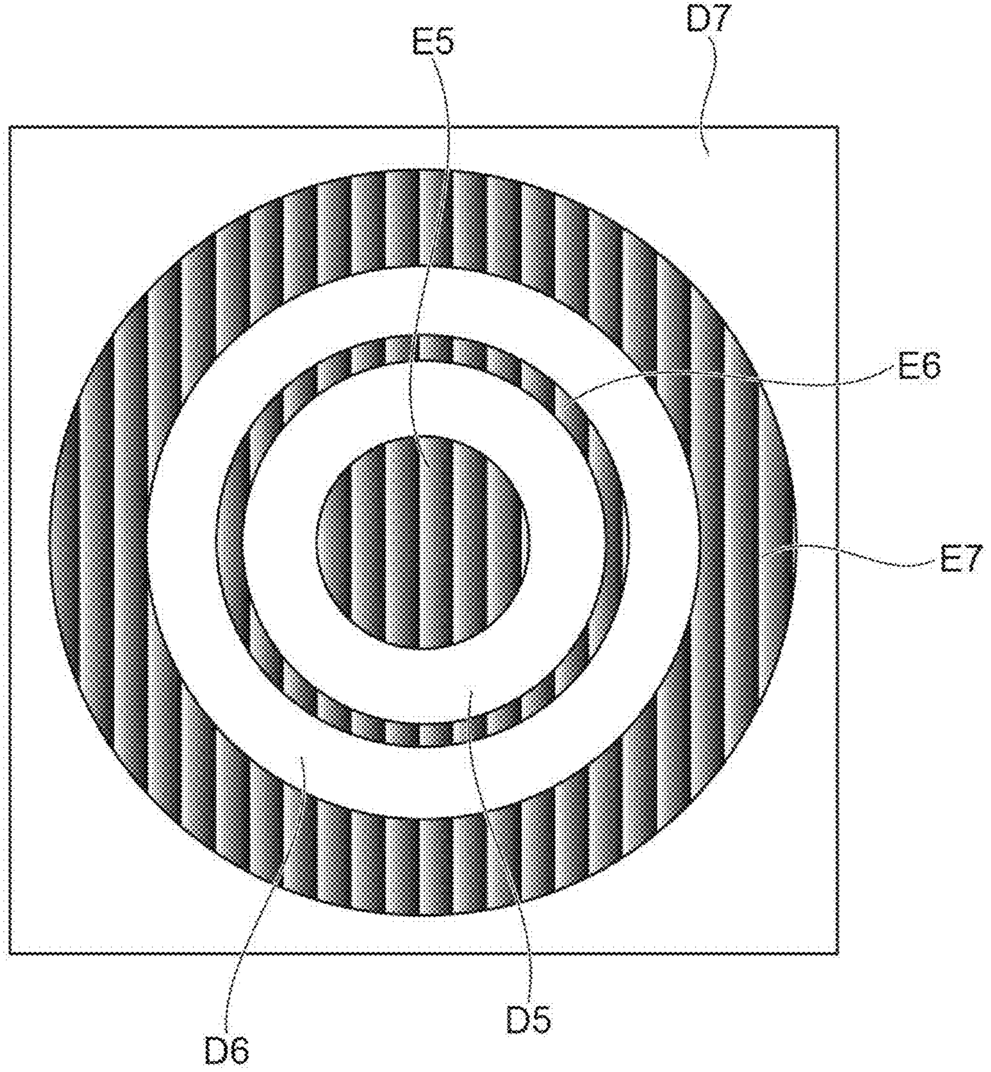
FIG. 27 is a diagram showing an example of the phase pattern forming the amplitude modulation type ring mask.

Alternatively, as shown in FIG. 27, the transmitting portions E5 to E7 may be formed of a grating of which the phase value changes periodically, and the phase values of the light-shielding portions D5 to D7 may be constant. Specifically, in the transmitting portions E5 to E7, a phase distribution that monotonically increases from 0 (rad) to 2π (rad) in each period is periodically repeated. Due to such a phase pattern, the emission direction of the beam emitted from the transmitting portions E5 to E7 is inclined with respect to the emission direction of the beam emitted from the light-shielding portions D5 to D7. Then, the position of the aperture 293 is slightly shifted with respect to the beam waist in a direction intersecting the optical axis. Even in such a mode, the aperture 293 can shield at least a part of the beam emitted from the light-shielding portions D5 to D7 of the spatial light modulator 28, and can pass the beam emitted from the transmitting portions E5 to E7 of the spatial light modulator 28.

As in the present modification example, a spatial light modulator forming the phase converter 62 may be common with a spatial light modulator forming the ring mask 63. The common spatial light modulator 28 may present a phase pattern in which a phase pattern forming the phase converter 62 and a phase pattern forming the ring mask 63 are superimposed. Similarly, in the image acquisition method of the second embodiment (refer to FIG. 19), a spatial light modulator that performs the phase conversion process S22 may be common with a spatial light modulator that performs the ring mask process S23. The spatial light modulator may present a phase pattern in which a phase pattern for performing the phase conversion process S22 and a phase pattern for performing the ring mask process S23 are superimposed. In this case, components forming the phase converter 62 and components forming the ring mask 63 are combined into one, so that the configuration of the device can be simplified. Alternatively, components that perform the phase conversion process S22 and components that perform the ring mask process S23 are combined into one, so that the configuration of the device can be simplified.

The microscope device and the image acquisition method according to the present disclosure are not limited to the embodiments described above, and can be modified in various other modes. For example, in the embodiments, a case where two-photon excitation is caused to occur in the object to be observed has been described. The microscope device and the image acquisition method according to the present disclosure is effective in a case where n-photon excitation (n is an integer of 2 or more) is caused to occur in the object to be observed. Namely, in the intensity modulation step S12 of the excitation beam output step S1, the light modulator 12 of the excitation beam output unit 10 outputs the excitation beam La of which the temporal waveform of the light intensity includes the n-th root of a linear function of a sine wave. Therefore, the terms "two-photon excitation" and "square root" in the embodiments described above can all be replaced with "n-photon excitation" and "n-th root".

In the embodiments, the temporal waveform of the light intensity of the excitation beam La is the square root of a linear function of a sine wave during the entire duration of each period. The present disclosure is not limited to such a mode, and the temporal waveform of the light intensity of the excitation beam La may be the square root of a linear function of a sine wave only in a part of the duration of each period, typically, only in a duration including the maximum value Imax.

In the second embodiment, a case where the polarization converter 61, the phase converter 62, and the ring mask 63 are disposed on the optical path between the excitation beam output unit 10 and the optical scanner 22 has been provided as an example. At least one element of the polarization converter 61, the phase converter 62, and the ring mask 63 may be disposed on the optical path between the optical scanner 22 and the objective lens 25. At least one element of the polarization converter 61, the phase converter 62, and the ring mask 63 may be disposed on the optical path between the objective lens 25 and the object B to be observed.

In the second embodiment, a case where the ring mask 63 is of an amplitude modulation type has been provided as an example. Even when the ring mask 63 is of a phase modulation type or a composite type of an amplitude modulation type and a phase modulation type, as in the second embodiment, by using beam that is a combination of azimuthally polarized beam and a spiral phase, the focusing diameter can be reduced.

The principles of the present invention have been shown and described in the preferred embodiments; however, those skilled in the art will recognize that the present invention can be changed in disposition and details without departing from such principles. The present invention is not limited to the specific configurations disclosed in the embodiments. Therefore, rights to all modifications and changes deriving from the claims and the scope of the concept thereof are claimed.

REFERENCE SIGNS LIST

1, 2, 2A: microscope device, 9: mirror, 10: excitation beam output unit, 11: light source, 12: light modulator, 20, 20A: optical system, 21: beam expander, 22: optical scanner, 23: relay lens system, 24: dichroic mirror, 25: objective lens, 28: spatial light modulator, 29: aperture optical system, 30: harmonic detector, 40: image generator, 50: signal generator, 211, 212: lens, 221, 222: scanner, 223: optical system, 31: light detection device, 32: lock-in amplifier, 61: polarization converter, 62: phase converter, 63: ring mask, S1: excitation beam output step, S12: intensity modulation step, S2, S2*a*: excitation beam irradiation step, S3: harmonic detection step, S6: image generation step, S4, S5, S11, S31, S32: step, S21: polarization conversion process, S22: phase conversion process, S23: ring mask process, S24: focusing process, B: object to be observed, J: pulse, K: envelope, G11 to G13, G21 to G23: bar, Ha, Hb: focused spot shape, La: excitation beam, Lb: fluorescence, Lp: pulsed beam, P11, P12, P21 to P23: plot, Q: optical axis, Wa1: diameter, Wa2: width, Wb1, Wb2: length.

The invention claimed is:

1. A microscope device comprising:

a light source configured to output an excitation beam of which a temporal waveform of a light intensity includes an n-th root (n is an integer of 2 or more) of a linear function of a sine wave and of which a maximum value of the light intensity is higher than a saturation excitation light intensity of an object to be observed;

an optical system configured to irradiate the object to be observed with the light source from the excitation beam output unit; and a harmonic detector configured to detect a second harmonic included in a temporal waveform of a light intensity of fluorescence generated in the object to be observed due to a multiphoton excitation by an irradiation with the excitation beam.

2. The microscope device according to claim 1, wherein the light source includes a light source configured to output a pulsed beam, and an intensity modulation type light modulator configured to modulate the pulsed beam output from the light source to generate the excitation beam.

3. The microscope device according to claim 2, wherein the light modulator is an AO modulator.

4. The microscope device according to claim 2, wherein the light source is a laser light source.

5. The microscope device according to claim 1, wherein a minimum value in each period of the temporal waveform of the light intensity of the excitation beam is larger than 0.

6. The microscope device according to claim 5, wherein the minimum value in each period of the temporal waveform of the light intensity of the excitation beam is larger than 0.1% and smaller than 20% of a maximum signal that can be received by the harmonic detector.

7. The microscope device according to claim 1, wherein the harmonic detector includes a light detector configured to generate a signal according to the light intensity of the fluorescence generated in the object to be observed, and a lock-in amplifier configured to receive the signal from the light detector and to output a second harmonic included in a temporal waveform of the signal.

8. The microscope device according to claim 1, wherein the harmonic detector further detects a third harmonic included in the temporal waveform of the light intensity of the fluorescence generated in the object to be observed.

9. The microscope device according to claim 1, wherein the temporal waveform of the light intensity of the excitation beam output from the light source includes a square root of a linear function of a sine wave, and the harmonic detector detects the second harmonic included in the temporal waveform of the light intensity of the fluorescence generated in the object to be observed due to a two-photon excitation by the irradiation with the excitation beam.

10. An image acquisition method comprising:

outputting an excitation beam of which a temporal waveform of a light intensity includes an n-th root (n is an integer of 2 or more) of a linear function of a sine wave and of which a maximum value of the light intensity is higher than a saturation excitation light intensity of an object to be observed;

irradiating the object to be observed with the excitation beam output in the outputting the excitation beam;

detecting a second harmonic included in a temporal waveform of a light intensity of fluorescence generated in the object to be observed due to a multiphoton excitation by an irradiation with the excitation beam; and generating an observation image of the object to be observed based on the second harmonic.

11. The image acquisition method according to claim 10, wherein the outputting the excitation beam includes modulating a pulsed beam to generate the excitation beam.

12. The image acquisition method according to claim 11, wherein the pulsed beam is a laser beam.

13. The image acquisition method according to claim 10, wherein a minimum value in each period of the temporal waveform of the light intensity of the excitation beam is larger than 0.

14. The image acquisition method according to claim 13, wherein the minimum value in each period of the temporal waveform of the light intensity of the excitation beam is larger than 0.1% and smaller than 20% of a maximum signal that can be received in the detecting the second harmonic.

15. The image acquisition method according to claim 10, wherein the detecting the second harmonic includes generating a signal according to the light intensity of the fluorescence generated in the object to be observed, and outputting a second harmonic included in a temporal waveform of the signal.

16. The image acquisition method according to claim 10, wherein in the detecting the second harmonic, a third harmonic included in the temporal waveform of the light intensity of the fluorescence generated in the object to be observed is further detected, and in the generating the observation image, the observation image of the object to be observed is generated based on one or both of the second harmonic and the third harmonic.

17. The image acquisition method according to claim 10, wherein the temporal waveform of the light intensity of the excitation beam output in the outputting the excitation beam includes a square root of a linear function of a sine wave, and in the detecting the second harmonic, the second harmonic included in the temporal waveform of the light intensity of the fluorescence generated in the object to be observed due to a two-photon excitation by the irradiation with the excitation beam is detected.

* * * * *